(12) United States Patent
Zisimopoulos et al.

(10) Patent No.: US 9,609,144 B2
(45) Date of Patent: Mar. 28, 2017

(54) METHOD FOR POLICY CONTROL AND CHARGING FOR D2D SERVICES

(71) Applicant: QUALCOMM Incorporated, San Diego, CA (US)

(72) Inventors: Haris Zisimopoulos, London (GB); Georgios Tsirtsis, London (GB); Michaela Vanderveen, Tracy, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/267,828

(22) Filed: May 1, 2014

(65) Prior Publication Data

US 2014/0329494 A1  Nov. 6, 2014

Related U.S. Application Data

(60) Provisional application No. 61/819,495, filed on May 3, 2013.

(51) Int. Cl.
| | |
|---|---|
| *H04M 11/00* | (2006.01) |
| *H04M 15/00* | (2006.01) |
| *H04W 4/24* | (2009.01) |
| *H04L 12/14* | (2006.01) |
| *H04L 12/24* | (2006.01) |

(52) U.S. Cl.
CPC ........ *H04M 15/66* (2013.01); *H04L 12/1407* (2013.01); *H04M 15/88* (2013.01); *H04W 4/24* (2013.01); *H04L 41/082* (2013.01); *H04L 41/0893* (2013.01)

(58) Field of Classification Search
USPC .... 455/405, 406, 407, 408, 410, 411, 412.2, 455/415, 452.2, 232, 234, 235
See application file for complete search history.

(56) References Cited

U.S. PATENT DOCUMENTS 8,442,485 B2 * 5/2013 Chowdhury .......... H04M 15/00
370/328
9,037,127 B2 * 5/2015 Raleigh ............ G06Q 10/06375
455/419

(Continued)

FOREIGN PATENT DOCUMENTS

EP         2466932 A1    6/2012
WO     2012045348 A1    4/2012

OTHER PUBLICATIONS

International Search Report and Written Opinion—PCT/US2014/036708—ISA/EPO—Aug. 20, 2014.

*Primary Examiner* — Dai A Phuong
(74) *Attorney, Agent, or Firm* — Harrity & Harrity, LLP

(57) ABSTRACT

Systems and methods are provided for providing policy control and charging for device to device (D2D) services. A network entity transmits, to at least one mobile entity, configuration data including device-to-device data, and receives, from the at least one mobile entity, an accounting report associated with device-to-device communication. The network entity transmits, to a charging function entity, a charging report based on the accounting report received from the at least one mobile entity. A policy control function entity performs a policy control and enforcement based at least on the accounting report received from the at least one mobile entity.

29 Claims, 24 Drawing Sheets

(56) References Cited

U.S. PATENT DOCUMENTS

| | | | |
|---|---|---|---|
| 2003/0114142 A1* | 6/2003 | Brown | H04M 15/00 455/408 |
| 2011/0320323 A1 | 12/2011 | Cuervo | |
| 2012/0196566 A1* | 8/2012 | Lee | H04M 15/80 455/408 |
| 2012/0224677 A1 | 9/2012 | Riley et al. | |
| 2013/0044646 A1* | 2/2013 | Qu | H04M 15/765 370/259 |
| 2013/0288645 A1* | 10/2013 | Zheng | H04W 72/0446 455/411 |
| 2014/0004815 A1* | 1/2014 | Shaw | H04L 12/1407 455/405 |
| 2014/0078971 A1* | 3/2014 | Bontu | H04W 8/005 370/329 |
| 2014/0094122 A1* | 4/2014 | Etemad | H04W 76/02 455/41.2 |
| 2014/0273933 A1* | 9/2014 | Sharma | H04M 15/65 455/406 |
| 2014/0328299 A1* | 11/2014 | Kalhan | H04W 76/023 370/329 |
| 2015/0110052 A1* | 4/2015 | Venkatachalam | H04W 76/023 370/329 |
| 2015/0139197 A1* | 5/2015 | He | H04W 24/04 370/336 |
| 2015/0146687 A1* | 5/2015 | Kim | H04W 76/023 370/331 |
| 2015/0382392 A1* | 12/2015 | Morita | H04W 72/04 370/329 |
| 2016/0150091 A1* | 5/2016 | Liu | G06Q 20/322 455/406 |

* cited by examiner

METHOD FOR POLICY CONTROL AND CHARGING FOR D2D SERVICES

CROSS-REFERENCE TO RELATED APPLICATIONS

This application claims the benefit of U.S. Provisional Patent Application Ser. No. 61/819,495 entitled "METHOD FOR POLICY CONTROL AND CHARGING FOR D2D SERVICES", which was filed May 3, 2013. The aforementioned application is herein incorporated by reference in its entirety.

BACKGROUND

I. Field

The following relates generally to wireless communication, and more specifically to providing policy control and charging for device to device (D2D) services.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can concurrently support communication for multiple user terminals. Mobile devices respectively can communicate with one or more base stations via transmissions on forward and reverse links. The forward link (or downlink) refers to a communication link from base stations to user terminals, and the reverse link (or uplink) refers to a communication link from user terminals to base stations. Further, communications between user terminals and base stations can be established via single-input single-output (SISO) systems, multiple-input single-output (MISO) systems, multiple-input multiple-output (MIMO) systems, and so forth.

In addition to the foregoing, D2D wireless communication networks enable communication devices to transmit, or receive information while on the move and without the need for traditional base stations. The D2D wireless communication network may be an ad hoc communication network, etc. These communication networks can be communicatively coupled to other public or private networks, for example via wired or wireless access points, in order to facilitate transfer of information to and from user terminals. Such D2D communication networks typically include a plurality of access terminals (e.g., mobile communication devices, mobile phones, wireless user terminals), communicating in a peer-to-peer fashion. For example, each device in a D2D communication may be called a peer device, a partner device, etc. The communication networks may also include beacon points that emit strong signals to facilitate D2D communication amongst access terminals; for example, emitted beacons can contain timing information to aid in timing synchronization of such terminals. These beacon points are positioned to provide wide area coverage as respective access terminals travel within and across different coverage areas.

Wireless communication employing the licensed spectrum, whether facilitated directly by a base station, or utilizing D2D communication between user terminals, involves electronic resources provided by owners/licensees/providers of the spectrum. Accordingly, policy control and charging is an important aspect of a service provider's business model.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In accordance with one or more aspects of the examples described herein, there is provided a system and method for providing policy control and charging for device to device (D2D) services. In one example, a network entity transmits, to at least one mobile entity, configuration data including device-to-device data, and receives, from the at least one mobile entity, an accounting report associated with device-to-device communication. The network entity transmits, to a charging function entity, a charging report based on the accounting report received from the at least one mobile entity. A policy control function entity performs a policy control and enforcement based at least on the accounting report received from the at least one mobile entity.

In a second example, the network entity further transmits, to a policy and rules charging function, a request for a policy of the at least one mobile entity and receives the policy, from the policy and rules charging function, based on the request, where the configuration data is based on the received policy.

In a third example, the network entity further receives an indication of at least one of: i) activation or deactivation, ii) initiation or termination, iii) connection duration or a quantity of data transferred, iv) levels or resources associated with a quality of service (QoS), v) inter-operation communication, or vi) inter-operator signaling associated with the at least one mobile entity.

BRIEF DESCRIPTION OF THE DRAWINGS

FIG. 18b illustrates optional steps in accordance with the methodology of FIG. 18a.

FIG. 18c illustrates further optional steps in accordance with the methodology of FIG. 18a.

FIG. 19a illustrates an embodiment for policy control and charging for D2D services, in accordance with the methodology of FIG. 18a.

FIG. 19b illustrates optional components for the apparatus of FIG. 19a.

FIG. 19c illustrates further optional components for the apparatus of FIG. 19a.

DETAILED DESCRIPTION

Figure 1:
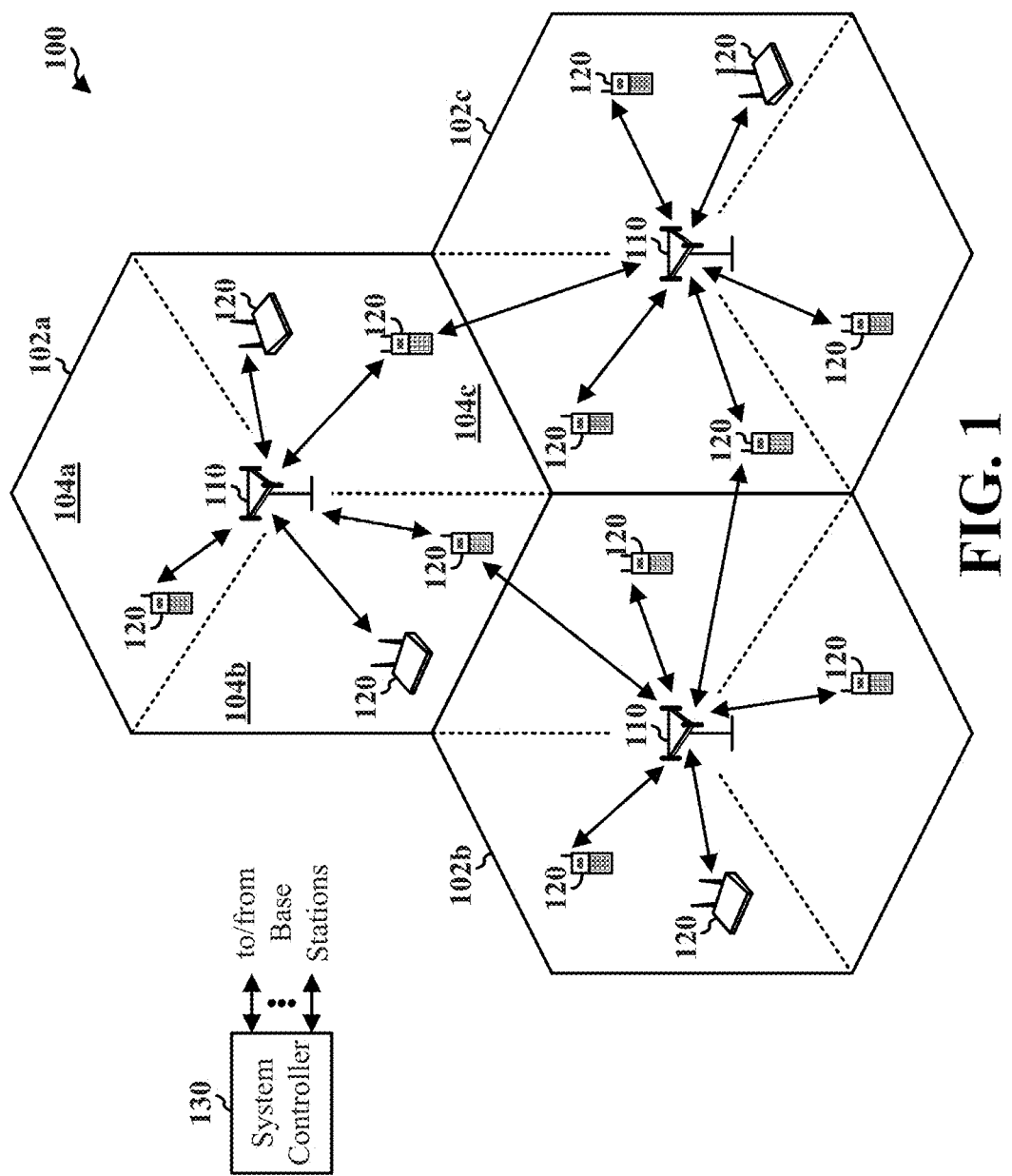
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that some aspect(s) can be practiced without these specific details. In other instances, well-known structures and devices are shown in block diagram form in order to facilitate describing one or more aspects.

In addition, various aspects of the disclosure are described below. It should be apparent that the teachings herein can be embodied in a wide variety of forms and that any specific structure and/or function disclosed herein is merely representative. Based on the teachings herein one skilled in the art should appreciate that an aspect disclosed herein can be implemented independently of other aspects and that two or more of such aspects can be combined in various manners. For example, an apparatus can be implemented, or a method practiced using any number of the aspects set forth herein. In addition, an apparatus can be implemented, or a method practiced using other structure or functionality in addition to or other than one or more of the aspects set forth herein. As an example, many of the methods, devices, systems and apparatuses described herein are described in the context of providing secure tracking and reporting of wireless resource usage at a terminal device. It should be appreciated that similar techniques could apply to other communication environments.

As wireless communication systems evolve, various forms of communication can be employed including direct wireless interface to network access points, relayed interface to access points (e.g., by way of one or more terminal devices), or D2D communication between user terminals (UTs). If a communication system does not require operator-owned access points, yet makes use of licensed spectrum, there should be a way to enable a spectrum provider to assess a level of usage of airlink resources. The level of usage is typically related to infrastructure and licensing costs, and consequently is useful data for properly pricing services provided to subscribers, or for other management reasons.

In traditional cellular systems where operator-owned access points provide direct or indirect service to communication resources, such access points can determine resource usage levels for subscriber devices. Accordingly, user-related security concerns related to device usage (e.g., based on user error, user fraud, or the like) are mitigated or avoided. For D2D communications, however, the operator controlled access points, if present, have limited capacity to monitor usage levels of surrounding UTs to perform these tracking functions. Specifically, operator-controlled access points are either not needed for or only indirectly involved in D2D communications.

Moreover, some conventional models associated with wireless communications are being displaced. For example, cognitive phones employed for use in licensed and unlicensed spectrums are increasingly being employed. Likewise, D2D frameworks for communications are being employed. Consequently, conventional models for tracking use of spectrum bandwidth, services consumed, etc., are becoming inefficient for recouping expenses associated with wireless infrastructure utilized by terminals, let alone monetizing such use. Regardless of the form of communication, a point of relative commonality across wireless communication schemes is use of resources by user terminals.

Accordingly, one manner of addressing the foregoing paradigm shift in communication models is for UTs to conduct periodic, self-reported accounting associated with resource utilization. In this model, devices can report resource usage in conjunction with wireless communications back to a network. Reporting can be conducted periodically, sporadically—based on occurrence of a determined condition, or based on a network reporting trigger, etc., as prescribed in a service agreement, for example—or the like. The report can comprise various data characterizing usage of D2D or network resources. Thus, for instance, the report can specify a number of data packets received/sent/consumed in communication, number of bytes received/sent/consumed, time spent in an active state, and so on. To this end, a wireless terminal can wait until a connection to the service provider's network is available, and then upload a usage report back to a network accounting server. The accounting server can be operated by the service provider or an affiliated service provider, for instance.

In addition to the foregoing, a UT can be associated with a terminal-specific digital certificate, stored in memory at the mobile terminal. The terminal-specific digital certificate can include or be associated with several parameters. For instance, the parameters can comprise a device identifier for the UT (e.g., a hardware address or universally unique identifier [UUID]), a public key associated with the identifier (e.g., a 64-byte or 2048 bit number), a serial number, and a Certificate Authority (CA) signature. Additionally, the digital certificate can be associated with secret data or material indicative of and private to the specific UT, utilized to generate a digital signature unique or substantially unique to the UT.

The terminal-specific secret data/material can be embedded during manufacturing of such device, in secure hardware, software or a combination thereof for example. Additionally, the secret data/material can be used (e.g., as a private key) to secure the collection of usage data and the compilation of an accounting report and transmission thereof to remote entities, and to facilitate integrity, non-repudiation, and other security goals. For instance, a signature computed using a private key part of a public/private key pair associated with the digital certificate can be utilized by a network accounting server to verify identification (ID) of a submitting terminal as well as integrity of data in the report.

In one aspect, the security measures comprise securing accounting records for accuracy and transmission integrity prior to transmitting the records. For example, a terminal can employ a digital certificate specific to the terminal to digitally sign the accounting records. In one aspect, the process of digital signature involves the terminal employing a key private to the terminal to execute a signature on a hash of the accounting records (e.g., a hash function applied to pertinent accounting data). When the signed records reach an Accounting Server, the Server can verify the records having been collected by the terminal identified by the certificate. In one instance, the Accounting Server receiving the signed records can utilize the terminal's public key to verify the associated message. To this end, the Accounting Server can employ a database of digital certificates (e.g., terminal identifiers and corresponding public keys), or else can validate such certificates in other suitable manners.

An alternative mechanism for achieving the goal of securing and authenticating terminal-initiated accounting records involves a terminal-specific secret data, material, key, etc., that is stored at both the terminal and at a network entity (e.g., the accounting server). This terminal-specific secret data/material/key is referred hereinafter as a shared-secret key. Additionally, it is to be appreciated that the shared-secret key can, according to various aspects, be of a different form from the private key discussed above (e.g., different length, generated from a different function, and so forth) or a similar form. The shared-secret key can be employed in both securing data stored at or transmitted from a terminal, and authenticating data received at a recipient of the transmission.

When employing a shared-secret key, a terminal can generate a message authentication code (MAC) (which also can be referred to as a message integrity code [MIC]). For instance, the MAC can be generated with a keyed one-way hash function, such as an HMAC-MD5 function, or HMAC-SHA1 function, or the like. The MAC (or MIC) can be written onto a report generated and stored in the terminal (e.g., in non-secure memory) or transmitted to an external device (e.g., the accounting server) as a means of securing the data stored in the report.

When the accounting server receives such a transmission, a corresponding version of the MAC is generated by the server, using the same shared-secret key and keyed one-way hash function. The MAC can be compared with the MAC written onto the report by the terminal. If the comparison is a match, the accounting server can infer that the report is both initiated by the particular terminal and not tampered with, and authenticate the report. If the comparison is not a match, the accounting server can infer that the report is not authentic. Results of the comparison based on the shared-secret key are referred to as digital authentication. Digital authentication therefore, as utilized herein (and in contrast to a digital signature), refers to a shared-secret key (or other suitable data/material) employed by both the terminal and the accounting server in securing transmitted data and verifying the integrity of received data, respectively. It should be appreciated that where digital signature or digitally signing is referred to herein for securing or verifying data, digital authentication can be employed as an alternative to or in addition to digital signature, unless otherwise clear from pertinent context.

A wireless communication accounting record, as described herein, can reflect usage of licensed spectra quantified in a variety of ways. For example, total number of IP (Internet Protocol) data packets exchanged by the terminal during a certain period, total number of bytes consumed, sent or received in a certain period, duration of time the terminal is "active", or a subset thereof can serve to quantify data contained in the record. Furthermore, the record can specify an ID of a communication partner for each active period. The latter feature can enable cross-verification of records submitted by UTs, as discussed in detail, infra.

Wireless terminals operated in a D2D fashion can be configured to track respective spectrum usage efficiently. Processing resources can therefore be conserved at network components when such terminals compile and report their own accounting records to the infrastructure. However, because the terminals are often only marginally controlled, or not controlled at all, by the operator's network during D2D communication, security risks arise due to device-managed tracking and reporting.

Moreover, accurate data related to respective UT resource usage can be employed in connection with billing advertisers (e.g., who pay as a function of UT usage, or access thereto by respective advertisers), charging users for resource utilization, fee-splitting among users, service providers, advertisers, and the like. In addition, such data can be utilized to provision services as a function of user usage, type of usage, preferences, etc. as well as to set pricing for service providers, advertisers and the like for targeting a subset of users. Accordingly, aspects described herein can facilitate tracking of resource utilization, optimizing monetizing models, provisioning of services, setting rates, load balancing, enhancing user experience, personalization of services, optimizing resource allocation, and the like.

Some security threats associated with device-managed accounting can include fraud (e.g., under-reporting), failure to report, or impersonation/spoofing of accounting records on behalf of other (e.g., victim) terminals. Other security threats can exist as well, and in general can arise as a result of intentional or unintentional mis-operation of a terminal, usually under the control of a user. As described herein, security measures are provided to mitigate or avoid threat of mistaken or fraudulent reporting.

In addition to the foregoing, resource usage can be tracked and usage records compiled in a secure platform, a trusted module, or tamper-resistant module of a terminal. This can mitigate unauthorized access to the records by another module of the device (e.g., a user or device-programmable module). Storage of records can also be secure and resistant to tampering by unauthorized software/hardware modules. In addition, such records can be securely provided to a software/hardware portion that performs the digital signing utilizing a UT-specific secret data (e.g., private key associated with a digital certificate). Once the records are digitally signed as discussed supra, the signed records can be output from the secure location of the device via a secure interface for transmission to the Accounting Server.

As noted above, accounting records can contain a cumulative record of bytes or packets sent, or received by the terminal in question during a period of time, or the record can be broken down by communicating peer during a time. For example, if terminal A has had D2D communications with terminal B, and then terminal C, terminal A can report the packets, number of packets, bytes of transferred data, etc., exchanged with B separately from the packets/number of packets/bytes exchanged with C. As an optional aspect, users can opt-in in exchange for certain benefits, for example, a service provider can cross-check records of different peer devices where such devices are configured to report accounting records per-peer. Crosschecking configuration could be for all sessions or for a possibly random subset of sessions in order to reduce crosschecking overhead. In at least one aspect, at the end of a D2D communication session, two or more terminals can exchange accounting records of a completed session for crosschecking, and respectively can obtain a summary of the session digitally signed by a private key particular to the partner terminal Crosschecking and cross signing enables additional system optimizations, such as employing a single D2D partner to submit accounting records for a session, which are signed by both partners. Which terminal performs the reporting can be negotiated/configured or determined statistically, and by mutual agreement of modules of such terminals.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal (UT). A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The RUM accumulation/utilization techniques described herein can be used for a system with sectorized cells as well as a system with multiple un-sectorized cells (e.g., a plurality of cells of a larger geographic area). For simplicity, in the following description, unless specified otherwise, the term "base station" is used generically for a fixed station that serves a sector as well as a fixed station that serves a cell. In addition, the term "cell" is used generically to refer to a geographic cell comprising multiple sectors, or a geographic area comprising multiple cells.

Terminals 120 are typically dispersed throughout the system, and each terminal 120 can be fixed or mobile. Terminals 120 can also be called a mobile station, user equipment, a user device, or some other terminology, as discussed above. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations. As used herein, a base station with which a terminal 120 maintains an active communication or an active registration is termed a "serving base station".

For a centralized architecture, a system controller 130 couples to base stations 110 and provides coordination and control for base stations 110. For instance, as discussed herein, the system controller can obtain accounting records submitted by terminals 120 to the base stations 110, and managing the accounting records at the system controller 130. Further, the system controller 130 can cross-check accounting records that are delineated by peer node (e.g., obtained by one base station or records obtained by multiple base stations 120 and stored in a database at the system controller 130), to provide additional verification of data submitted in such records.

For a distributed architecture, base stations 110 can communicate with one another as needed (e.g., employing a backhaul network, not depicted). Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
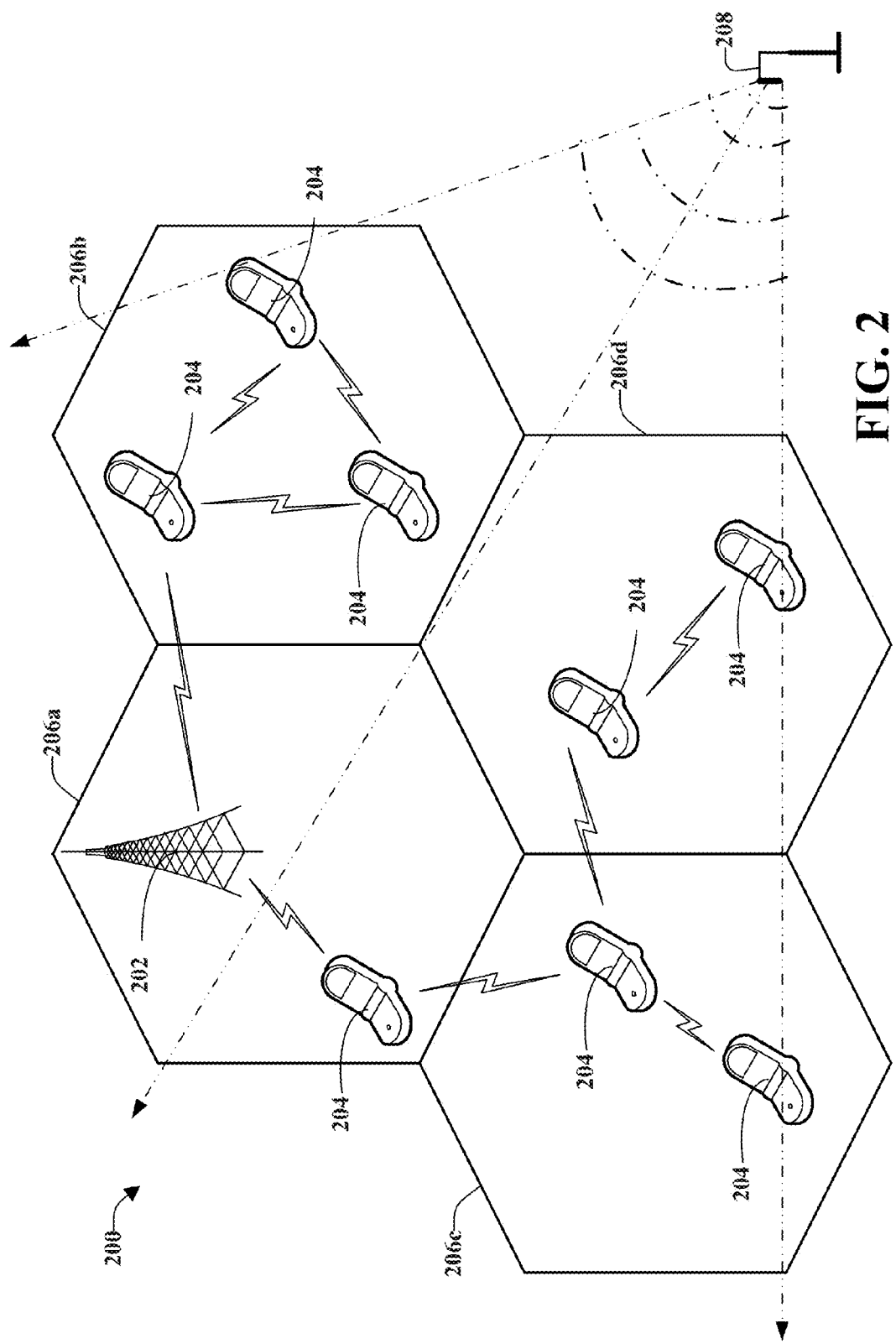
FIG. 2 depicts a block diagram of an example communication apparatus for employment with a wireless communication environment.

FIG. 2 is an illustration of a semi-planned D2D wireless communication environment 200, in accordance with various aspects. System 200 can comprise one or more base stations 202 in a cell, or sector (206a, 206b, 206c, 206d) that receives, transmits, repeats, etc., wireless communication signals to other base stations (not depicted), or to one or more mobile devices 204. As illustrated, base station 202 can provide communication coverage for a particular geographic area 206a. The base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art (e.g., see FIG. 20, infra).

Mobile devices 204 can be, for example, cellular phones, smart phones, laptops, handheld communication devices, handheld computing devices, satellite radios, global positioning systems, PDAs, or any other suitable device configured for wireless data exchange with a remote device. It should be appreciated that mobile devices 204 can also receive, transmit, repeat, etc., wireless communication signals to each other and/or to the base station(s) 202 of system 200. Additionally, system 208 can comprise a synchronization transmitter 208 that facilitates D2D communication between the mobile devices 204. For instance, synchronization transmitter 208 can transmit a synchronization timing sequence employed by the mobile terminals as a timing reference for D2D transmission, reception, processing, or the like (e.g., see also FIG. 13). In some circumstances, the timing sequence can be broadcast over a relatively wide geographic area (e.g., comprising multiple cells or sectors 206a, 206b, 206c, 206d), since the timing sequence can be a simple pulse signal generating and receiving little interference for other devices (202, 204). System 200 can be employed in conjunction with various aspects of the subject disclosure in order to facilitate providing a wireless communication environment (200), as set forth herein.

In 3GPP TS 22.115, section 4.6 Proximity Services (ProSe) the network may include collecting charging data. Charging data may be included during roaming of a user device. Online and/or offline charging may be supported. The Evolved Packet System (EPS) may be able to collect charging data for the ability to discover ProSe-enabled UEs served by the E-UTRAN of a different public land mobile network (PLMN). The EPS may be able to collect charging data for ProSe Discovery features including: (a) the ability of a ProSe-enabled UE to be discoverable, including based on the range class; (b) the ability to discover other ProSe-enabled UEs, including based on the range class; (c) the event of discovering a ProSe-enabled UE, including based on the range class. When a ProSe-enabled UE uses ProSe Communication or ProSe-assisted WLAN direct communications, the EPS may be able to collect charging data for this communication including: (a) Activation/deactivation; (b) initiation/termination; (c) duration and amount of data transferred; (d) QoS, if via E-UTRAN (e.g. levels of availability, allocated resource); (e) inter-operator communication; (f) inter-operator signaling. The EPS may be able to collect charging data for use of ProSe Discovery, ProSe Communication and/or ProSe-assisted WLAN direct communication by an application.

Charging records per application may be supported if required. For example, an application centric design may include the ability of a ProSe-enabled UE to be discoverable only for specific applications, the ability to discover other ProSe-enabled UEs, and/or discovery event reporting per application.

There is a desire for satisfying support for the above online charging features, e.g., prepaid services, based on dynamic policy control. The aspects described below may apply to both D2D discovery and communications.

Figure 3:
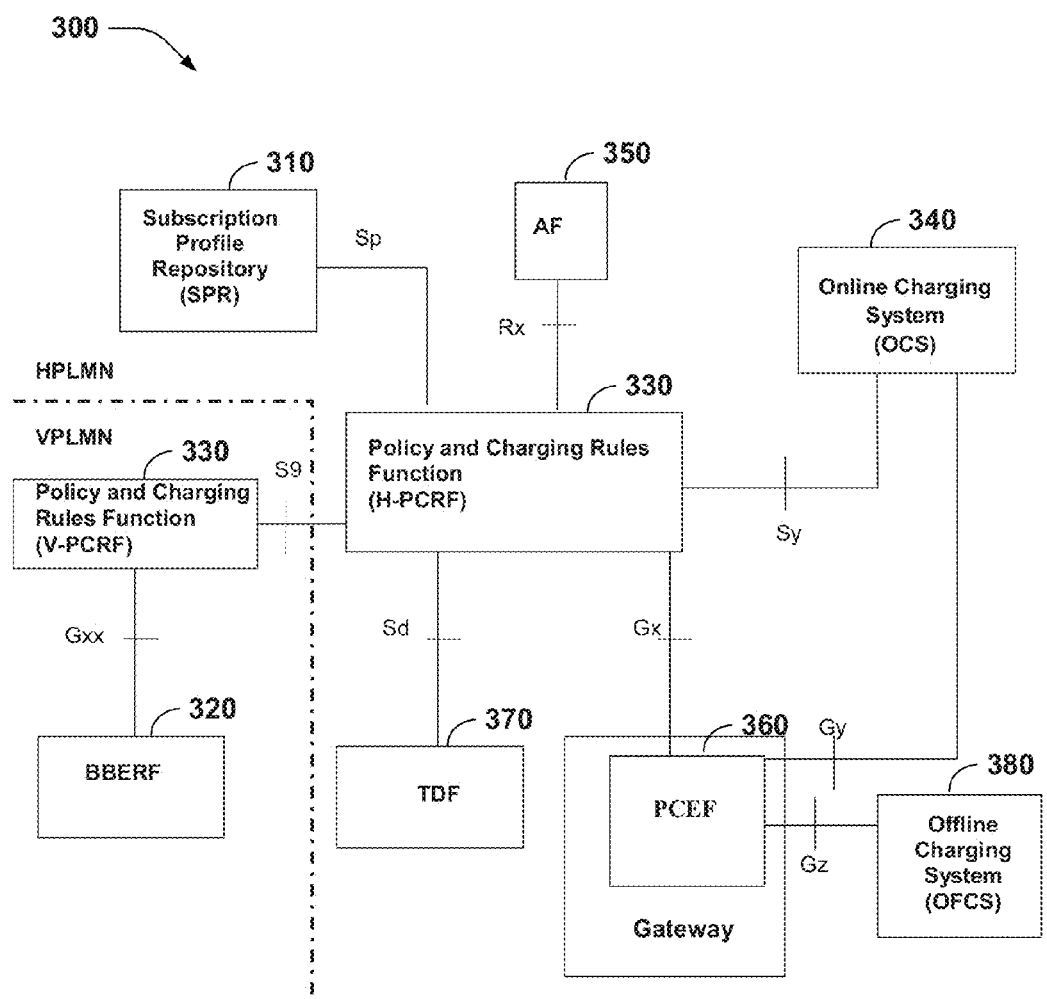
FIG. 3 depicts a block diagram of an example system that provides policy control and charging.

FIG. 3 depicts a block diagram of an example system 300 that provides policy control and charging. For example the system 300 may a policy charging and control (PCC) architecture of 3GPP TS 23.203. The system 300 may include a policy and charging rules function (PCRF) 330 supporting policy control and charging. The system 300 may include a subscription profile repository (SPR) database 310. For example, the SPR 310 provide subscriber/subscription information for the PCRF 330. The system 300 may include a bearer binding and event reporting function (BBERF) 320. The system 300 may include an application function (AF) 350 that provides session information. The system 300 may include an online charging system (OCS) 340 that provides credit control to the PCRF 330. The system 300 may include an offline charging system (OFCS) 380 that provides reporting of charging data. The system 300 may include a policy control enforcement function (PCEF) 360 for enforcing the policies and decisions by the H-PCRF 330. The system 300 may include a traffic detection function (TDF) 370.

In accordance with one or more embodiments of the present disclosure, there are provided techniques for policy control and charging for D2D services. Embodiment may include functional elements to facilitate applying PCC for Proximity Services (ProSe). Enforcement of policies may be directed to the UE from the network with one of the following embodiments. In one embodiment, policy enforcement may be provided via DPF/DAPF using S141/OMA DM. In another embodiment, policy enforcement may be provided directly from D2D GW via Sdx. In an aspect, Sdx becomes a bearer used for D2D control, reporting, and potentially user plane (UP) in case of D2D communication. In another aspect, Sdx becomes a D2D control and reporting interface based on small data interface such as, e.g., using SMS or other small data mechanisms defined in 3GPP TR 23.887.

Figure 4:
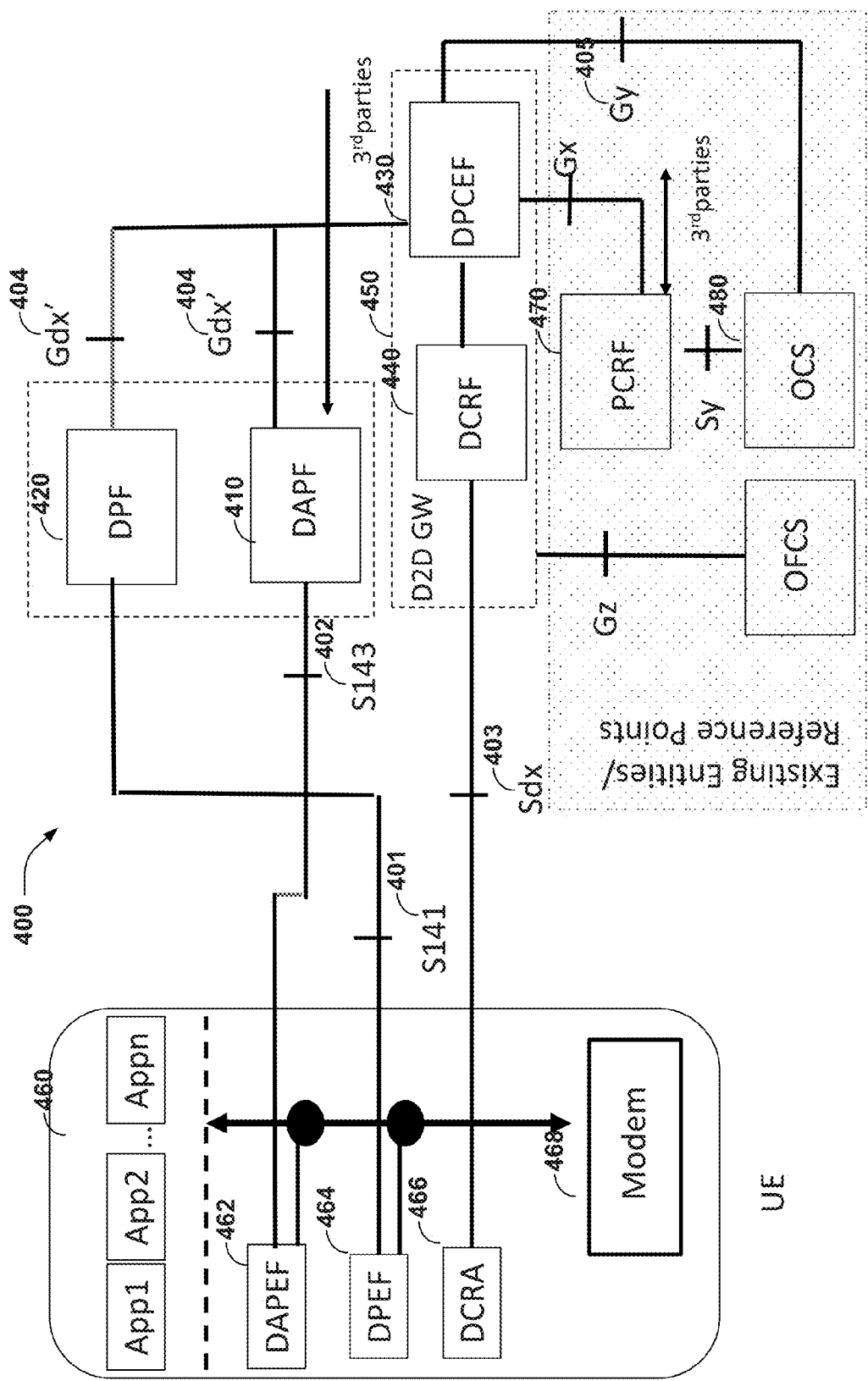
FIG. 4 illustrates a block diagram of an example system that provides policy control and charging for D2D services according to an embodiment of the disclosure.

FIG. 4 illustrates a block diagram of an example system 400 that provides policy control and charging for D2D services according to an embodiment of the disclosure. The system (network) 400 may include a D2D provisioning function (DPF) 420. For example, the DPF 420 may provision the UE 460 with configuration data for ProSe including, e.g., whether the UE 460 is permitted to discover, may be discoverable, and how many expressions the UE 460 is allowed to use. The DPF 420 may provision a charging data reporting rate. The DPF 420 may perform policy termination via S141 when triggered by the D2D GW 450 (DPCEF) 430.

The network 400 may include a D2D application provisioning function (DAPF) 410. For example, the DAPF 410 may provision the whitelist of applications that may be permitted to use ProSe discovery. The DAPF 410 may provision application specific configuration data for ProSe. For example, data may be related to individual applications. Configuration data for one application may dictate one set of rules, whereas configuration data for another application may dictate another set of rules. The DAPF 410 may perform application policy termination via S143 when triggered by a D2D Policy Enforcement Function (DAPEF) 430 of a D2D Gateway (D2D GW) 450. It may be noted that for ProSe communication, the policy may be enabled per D2D bearer. The configuration data format may be similar to DIDA (3GPP TS 24.312). DAPF 410 and DPF 420 may be combined in a single functional entity.

The D2D GW 450 may consist of logical functions including a DAPEF 430 and D2D Charging Reporting Function (DCRF) 440. The DAPEF 430 may initiate D2D policy termination when triggered by PCRF 470 or OCS 480 via Gdx' to the DPF 420 and DAPF 410. The DCRF 440 may receive the D2D charging from the UE 460 and may report the information to the PCRF 470.

Figure 5:
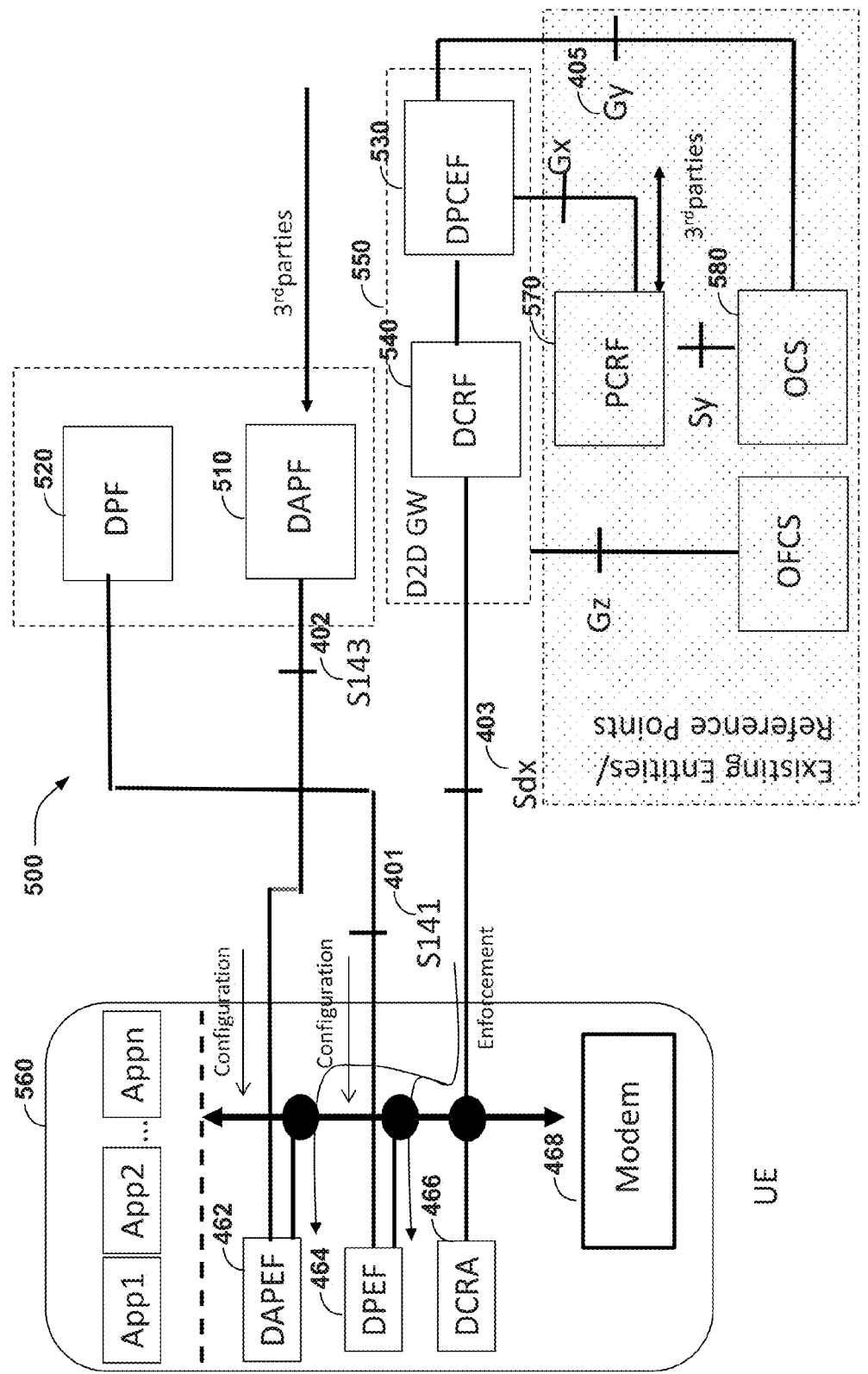
FIG. 5 illustrates a block diagram of another example system that provides policy control and charging for D2D services according to another embodiment of the disclosure.

FIG. 5 illustrates a block diagram of another example system 500 that provides policy control and charging for D2D services according to another embodiment of the disclosure. The system (network) 500 may include a D2D Provisioning Function (DPF) 520. For example, the DPF 520 may provision the UE 560 with configuration data for ProSe including, e.g., whether the UE 560 is permitted to discover, be discoverable, and how many expressions the UE 560 is allowed to use. The DPF 520 may provision the charging data reporting rate.

The network 500 may include the D2D Application Provisioning Function (DAPF) 510. For example, the DAPF 510 may provision the whitelist of applications that are permitted to use ProSe discovery. The DAPF 510 may provision application specific configuration data for ProSe. It may be noted that for ProSe communication the policy may be enabled per D2D bearer. The configuration data format may be similar to DIDA (3GPP TS 24.312). DAPF 510 and DPF 520 may be combined in a single functional entity.

D2D GW 550 may consist of logical functions including the DAPEF 530 and DCRF 540. The DAPEF 530 may initiate D2D policy termination when triggered by PCRF 570 or OCS 580 via Gdx' to the DPF 520 and DAPF 510. The D2D Charging Reporting Function may receive the D2D charging from the UE 560 and report the information to the PCRF 570.

In the embodiment of FIG. 4 the policy enforcement in the UE 460 may be performed via DPF 420/DAPF 410 using S141/S1243. In the embodiment of FIG. 5 the policy enforcement may be performed directly from D2D GW 550 using Sdx. In another aspect of the embodiment of FIG. 5, the PCEF in the UE 560 may communicate with the core network (CN) elements (e.g., PCRF 570, OCS 580, etc.) through a "Proxy-PCEF" in the network.

Embodiments, e.g., of FIG. 4 and FIG. 5, may include the following features in the UE 460, 560. The UE 460, 560 may include a D2D Application Policy Enforcement function (DAPEF) 462, 562 and D2D Policy Enforcement Function (DPEF) 464, 564. For example, the DAPEF 462, 562 may apply per Application D2D policy received from the DAPF 410, 510 including, e.g., which applications are allowed to use ProSe discovery. The DAPEF 462, 562 may perform D2D policy termination if requested including, e.g., revoking authorization of a specific application to use ProSe discovery or certain aspects of it. The DAPEF 462, 562 may provide charging data related to the applications using the ProSe to the D2D Charging Reporting Agent (DCRA) 466, 566.

For example, the DPEF 464, 564 may apply the D2D policy received from PCRF 470, 570. The DPEF 464, 564 may perform D2D policy termination if requested including, e.g., revoking authorization of a UE 460 to be discoverable. The DPEF 462, 562 may provide D2D policy information to the modem 468, 568, e.g., range, maximum number of expressions supported. The DPEF 462, 562 may provide charging data related to overall usage of ProSe to the DCRA 466, 566.

Embodiments may include the DCRA 466, 566. The DCRA 466, 566 may report to the DCRF 440, 540 charging data related to ProSe and related applications that use ProSe. The DCRF 440, 540 may adapt the charging data reporting rate based on configuration, e.g., from the DPF 420, 520.

The reference points may include a S141 interface 401, 501, S143 interface 402, 502, Sdx interface 403, 503, Gdx' interface 404 (e.g., of FIG. 4), and Gy interface 405, 505. The S141 interface 401, 501 may be from the DPF 420 to DPEF 464, 564. The S141 interface 401, 501 may be the OMA DM protocol for configuration. In an embodiment (e.g., of FIG. 4), the protocol for policy enforcement may be OMA DM.

The S143 interface 402, 502 may be from the DAPF 410, 510 to DAPEF 462, 562. The S143 interface 402, 502 may use the OMA DM protocol. In an embodiment (e.g., of FIG. 4), the protocol for policy enforcement may be OMA DM.

The Sdx interface 403, 503 may be from the DCRA 466, 566 to DCRF 440, 540. In an embodiment (e.g., of FIG. 5) the protocol for policy enforcement and charging reporting may include GTP-C/NAS in one aspect, and T5 in a second aspect.

The Gdx' interface 404 (e.g., of FIG. 4) may be from the DPCEF 430, 530 to the DPF/DAPF 420/410, 520/510. Any suitable protocol may be used.

The Gy interface 405, 505 may be from the OCS 480, 580 to the PCRF 470, 570. The Gy may include extensions for ProSe online charging. The protocol may include the Diameter protocol.

Figure 6:
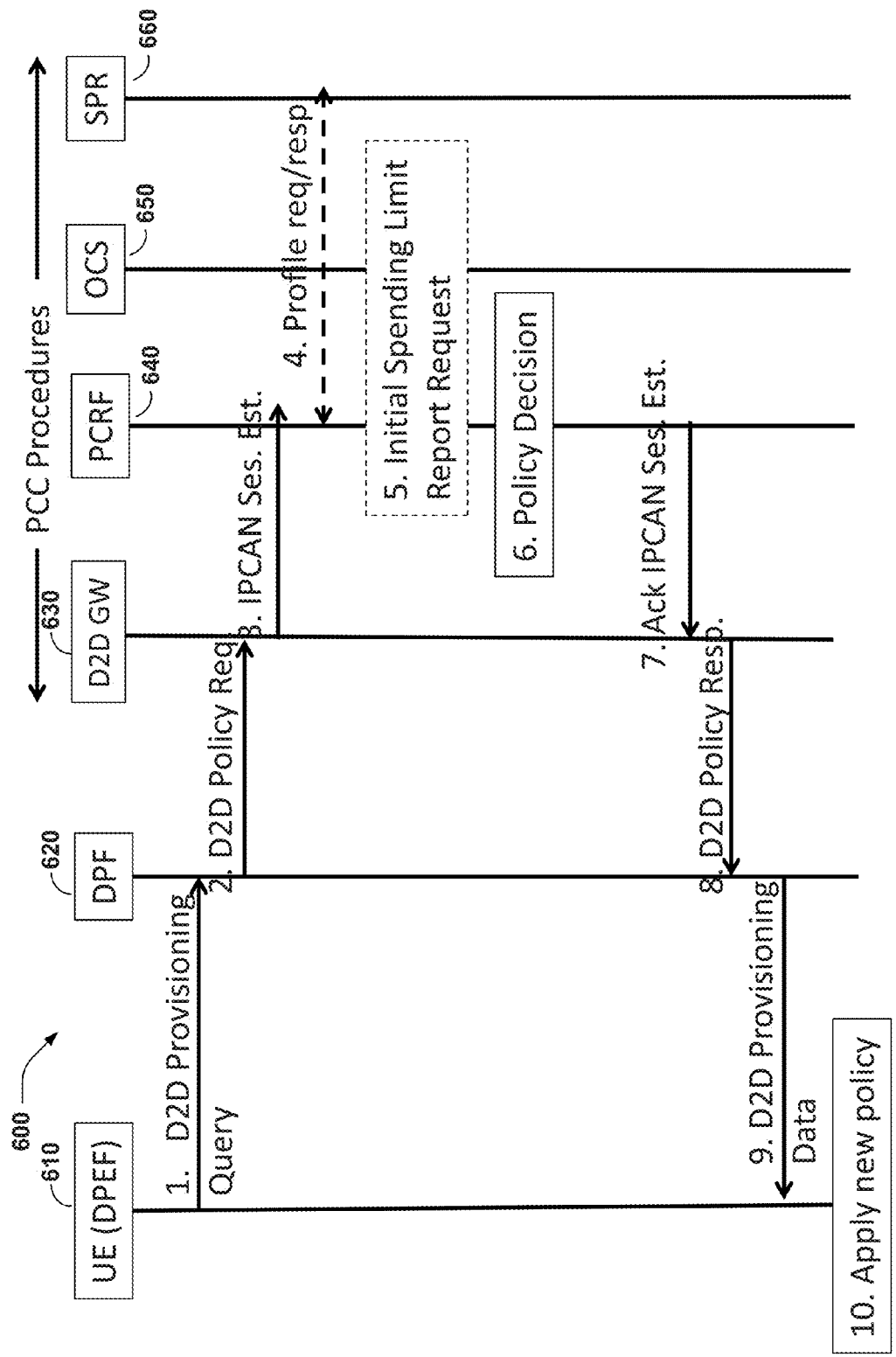
FIG. 6 illustrates an example signaling flow method with DPF provisioning based on a pull configuration.

FIG. 6 illustrates an example 600 signaling flow method with DPF provisioning based on a pull configuration. The 'pull' configuration may indicate a request from the UE 610. For example, the UE 610 'pulls' the data from the network. The method may include, at step 1, the UE sending a providing query to the DPF 620. At step 2, the DPF 620 may send a D2D policy request to the D2D GW 630. At step 3, the D2D GW 630 may establish an IPCAN session. At step 4, a profile request and response is transmitted between the PCRF 640 and SPR 660. At step 5, an initial spending limit is determined between the PCRF 640 and OCS 650. At step 6, a policy decision is made, e.g., based on the spending limit. At step 7, an IPCAN session establishment acknowledgement is send from the PCRF 640 to the D2D GW 630. At step 8, a D2D policy response is sent from the D2D GW 630 to the DPF 620. At step 9, D2D provisioning data is set from the DPF 620 to the UE 610. At step 10, a new policy is applied, e.g., based on the D2D provisioning data.

Figure 7:
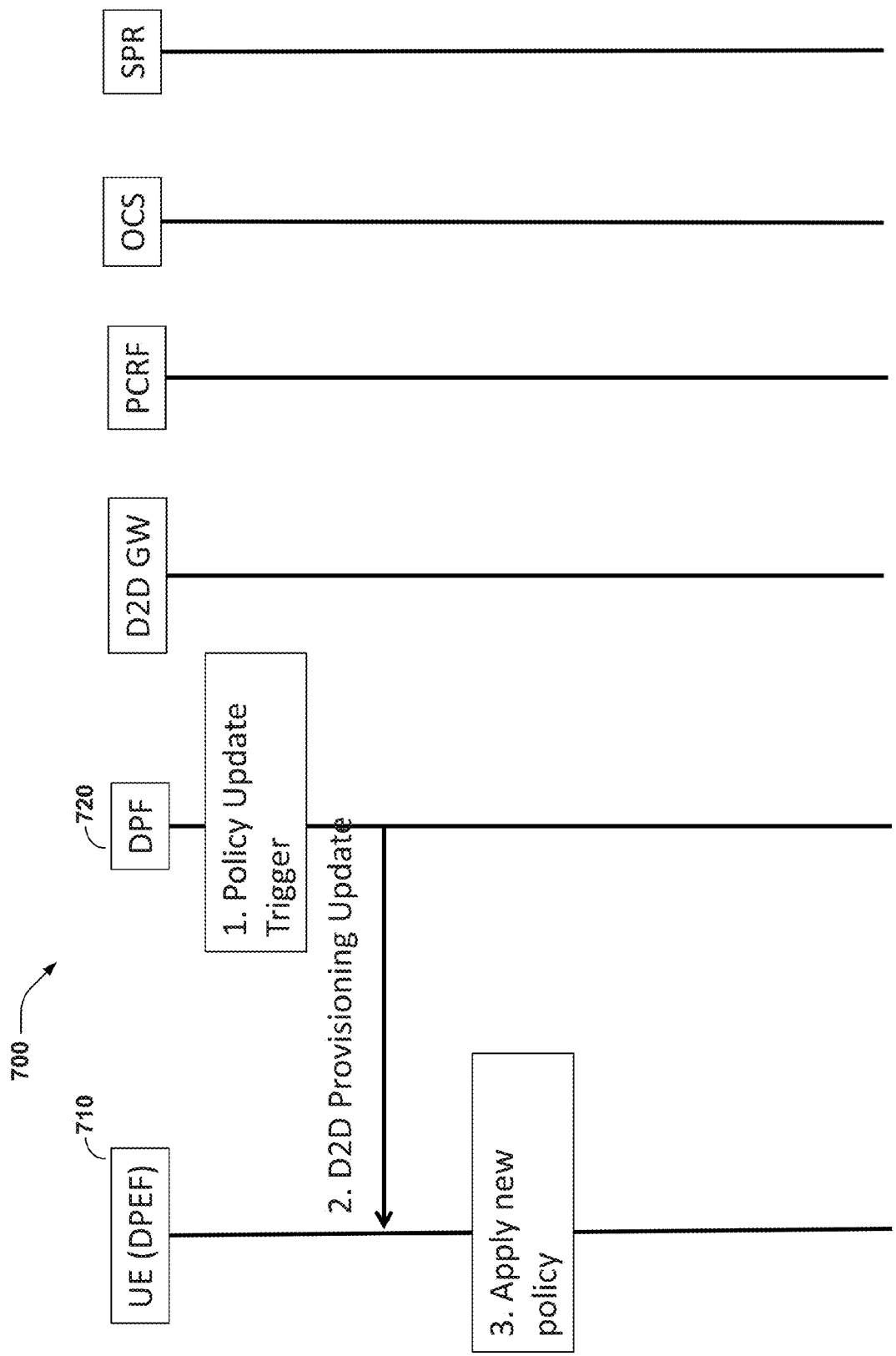
FIG. 7 illustrates an example signaling flow method with DPF provisioning based on a push/update configuration.

FIG. 7 illustrates an example 700 signaling flow method with DPF provisioning based on a push/update configuration. The 'push/update' configuration may indicate data is pushed out to the UE from the network. At step 1, a policy update trigger may prompt the DFP 720 to push or send an update to the UE 710. At step 2, the DPF 720 sends D2D provisioning update to the UE 710. At step 3, the UE 710 applies the new policy, e.g., based on the D2D provisioning update data.

Figure 8:
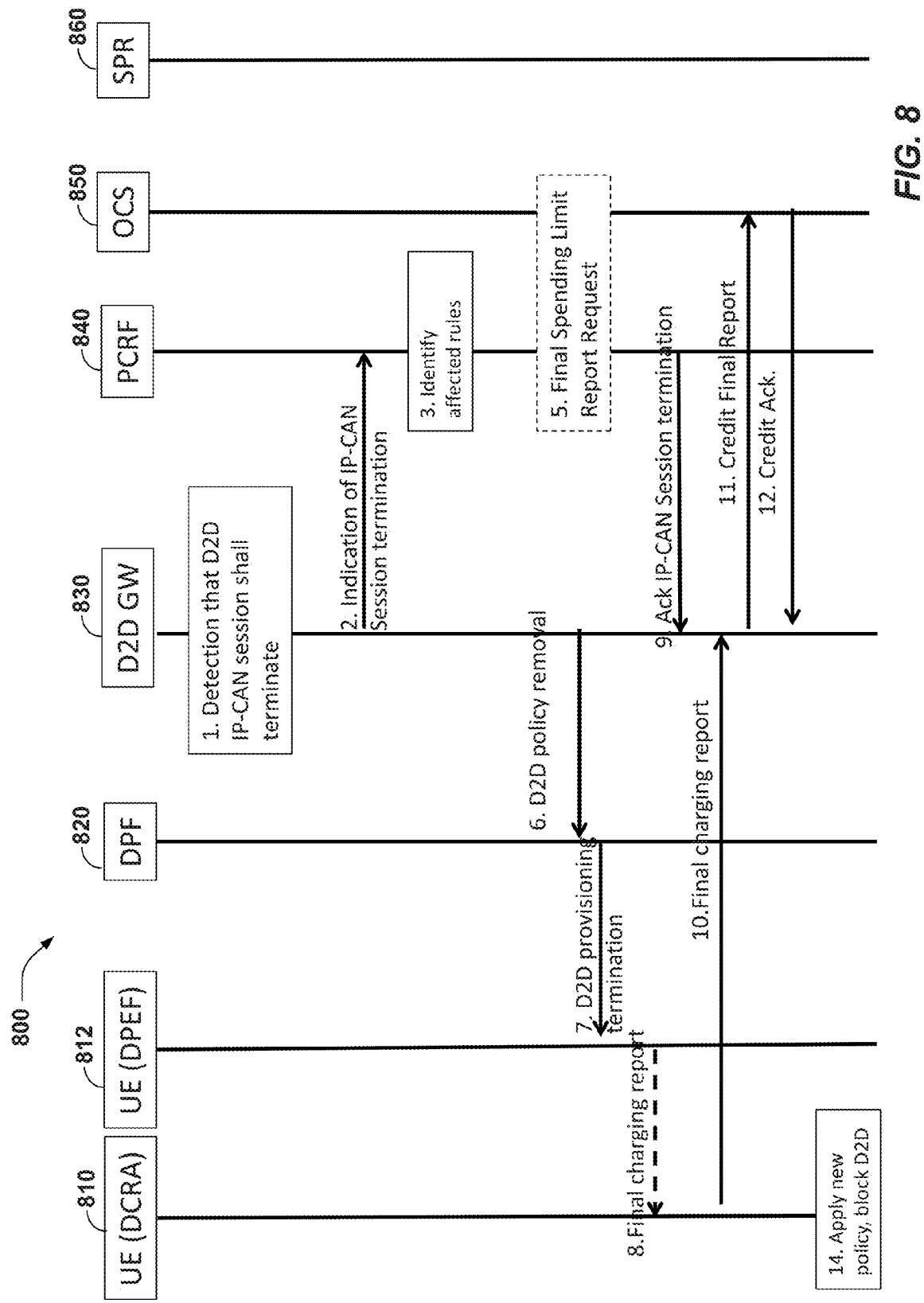
FIG. 8 illustrates an example signaling flow method for policy termination via DPF, e.g., based on the embodiment of FIG. 4.

FIG. 8 illustrates an example 800 signaling flow method for policy termination via DPF, e.g., based on the embodiment of FIG. 4. At step 1, the D2D GW 830 may detect that D2D IP-CAN session shall terminate. At step 2, the D2D GW 830 may send an indication of the IP-CAN session termination to the PCRF 840. At step 3, the PCRF 840 may identify the affect rules. At step 5, the PCRF 840 and OCS 850 determine a final spending limit. At step 6, the D2D GW 830 may send a D2D policy remove to the DPF 820. At step 7, the DPF 820 may send a D2D provisioning termination to the UE 810. At step 8, the UE (DPEF) 812 may send a final charging reporting to the UE (DCRA) 810. At step 9, the PCRF 840 may send an IP-CAN session termination acknowledgment to the D2D GW 830. At step 10, the UE (DCRA) 810 may send the final charging report to the D2D GW 830. At step 11, the D2D GW 830 may send a credit final report to the OCS 850. At step 12, the OCS 850 may send a credit acknowledgement to the D2D GW 830. At step 14, the UE (DCRA) 810 may apply the new policy and block D2D service(s).

Figure 9:
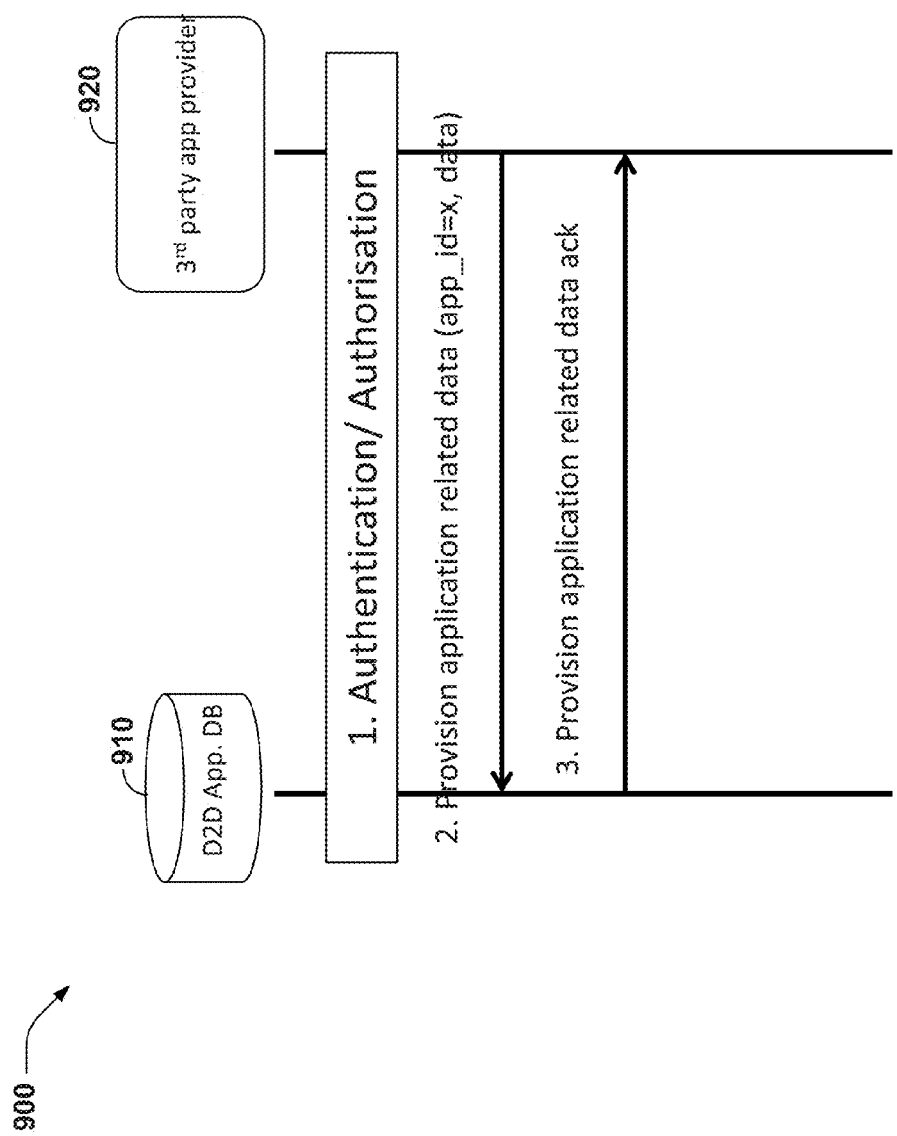
FIG. 9 illustrates an example signaling flow method for $3^{rd}$ party application provisioning.

FIG. 9 illustrates an example signaling flow method 900 for 3$^{rd}$ party application provisioning. At step 1, authentication and authorization may be performed between the D2D Application database 910 and the 3$^{rd}$ party application provider 920. At step 2, the provisioning application related data may be send from the 3$^{rd}$ party application provider 920 to the D2D application database 910. At step 3, a provisioning application related data acknowledgment may be sent from the D2D application database 910 to the 3$^{rd}$ party application provider 920.

Figure 10:
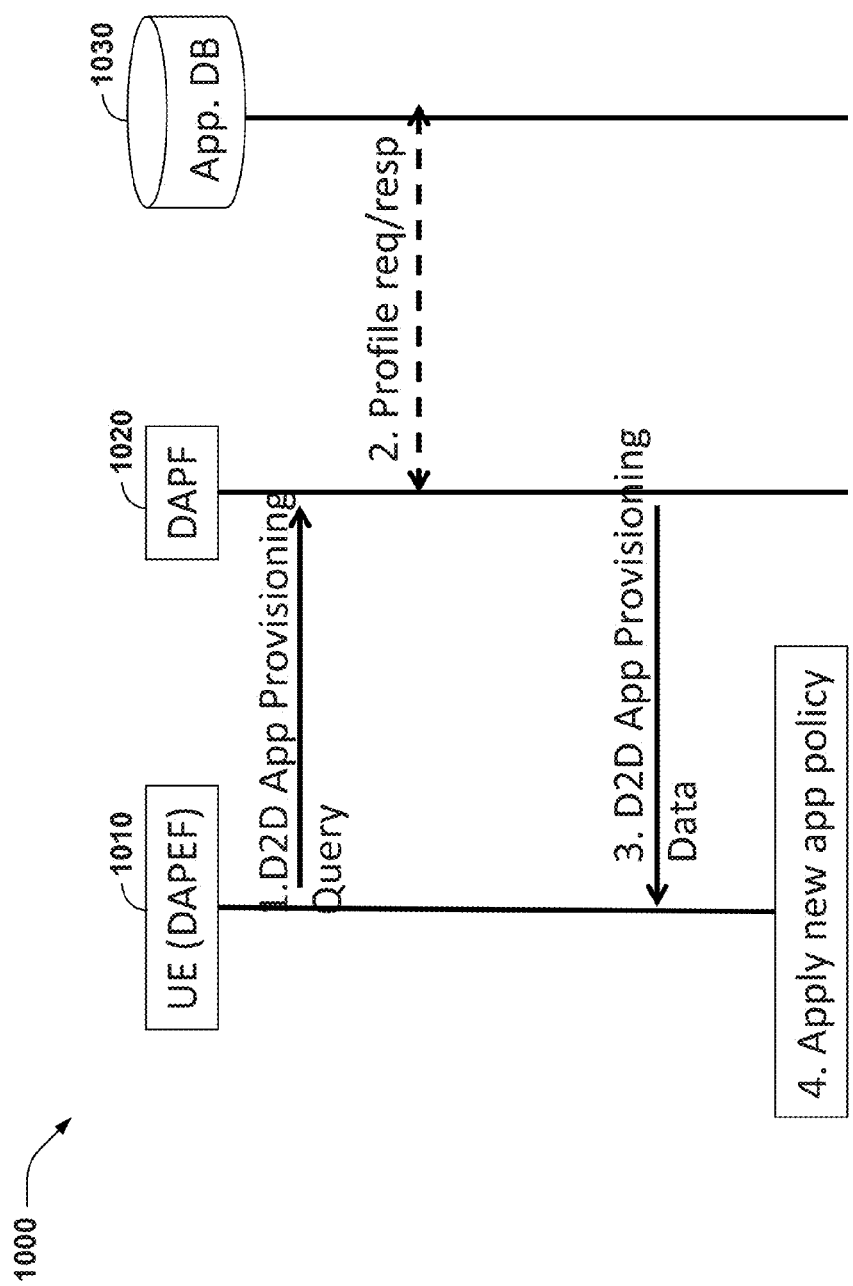
FIG. 10 illustrates an example signaling flow method for DAPF provisioning based on a pull configuration.

FIG. 10 illustrates an example signaling flow method 1000 for DAPF provisioning based on a pull configuration. The 'pull' configuration may indicate a request from the UE 1010. For example, the UE 1010 'pulls' the data from the network. Some example cases may include application "whitelisted" to use ProSe, application specific "range", a number of expressions the UE is allowed to use, and authorization for D2D communication. At step 1, the UE (DAPEF) 1010 may send a D2D application provisioning query. At step 2, the application database 1030 and DAPF 1020 may exchange profile request and response. At step 3, the DAPF 1020 may send a D2D application provisioning data to the UE (DAPEF) 1010. At step 4, the UE (DAPEF) 1010 may application new application policy, e.g., based on the D2D application provisioning data.

Policy enforcement may be accomplished using the Sdx interface. Alternatively or additionally, in one aspect, EPS bearer may be used for D2D control. For example, the D2D GW may be a special APN in a P-GW in HPLMN. The UE may establish connectivity to the D2D GW that is similar to a PDN connection to special APN. The control plane may be used to perform real time control between the UE and D2D GW such as policy enforcement and reporting of charging records. As long as the connection (default bearer) is active the UE may use D2D discovery and communication based on provided policy. When the PCRF or D2D GW decides to perform IP-CAN session termination, the PCRF or D2D GW may tear down the default bearer of the PDN connection.

Figure 11:
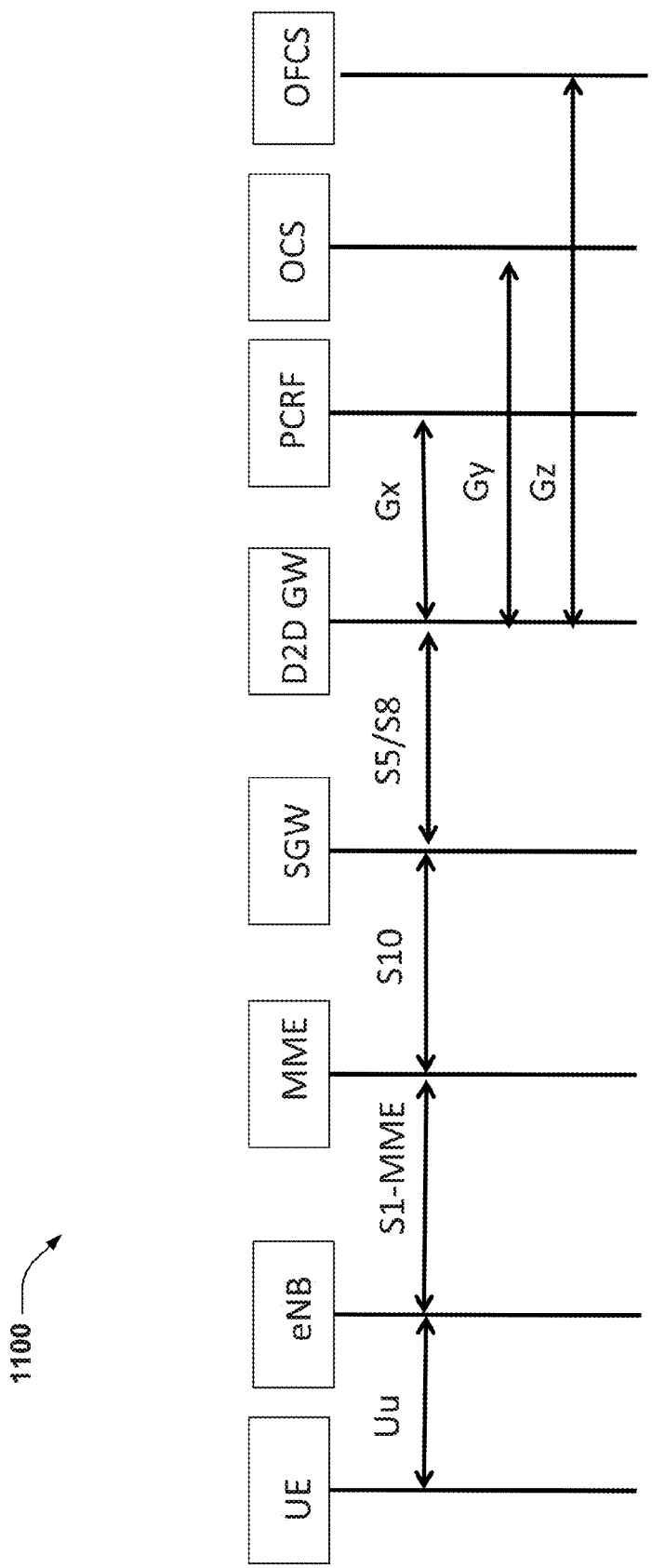
FIG. 11 illustrates an alternative to Sdx such as using a bearer for D2D control.

FIG. 11 illustrates an alternative to Sdx such as using a bearer for D2D control. FIG. 11 illustrates the interfaces between the communication system components.

Figure 12:
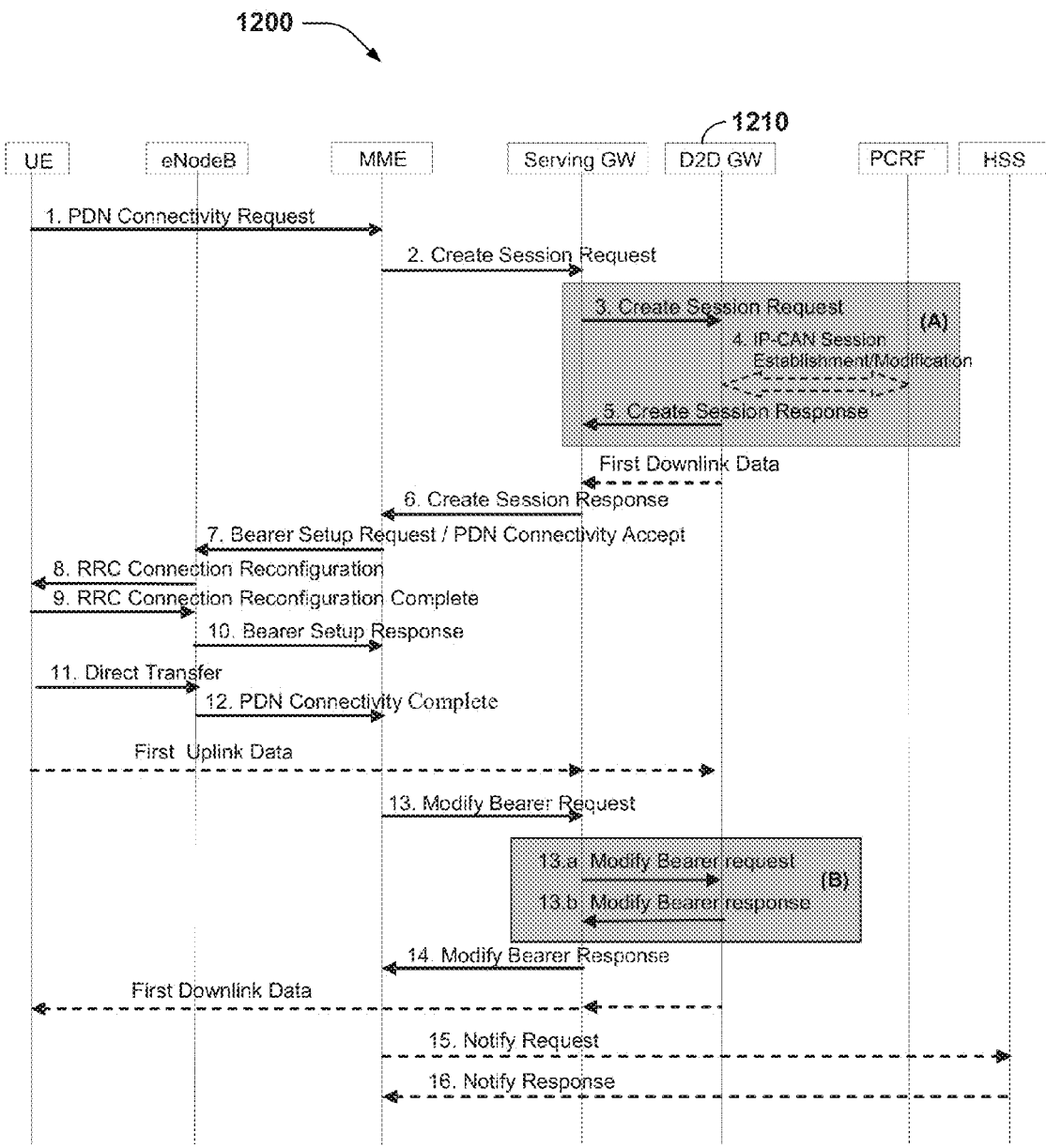
FIG. 12 illustrates an example signaling flow method for an alternative to Sdx such as using a bearer for D2D control.

FIG. 12 illustrates an example signaling flow method 1200 for an alternative to Sdx such as using a bearer for D2D control. D2D GW 1210 may be a special APN to a P-GW. The alternative may include no changes from an existing PDN connectivity procedure. Access to the APN may provide subscription control, i.e., only UEs with ProSe subscription may access the APN. D2D PDN connection may be used for providing IP address for D2D communication, sending charging records, policy enforcement, etc.

Figure 13:
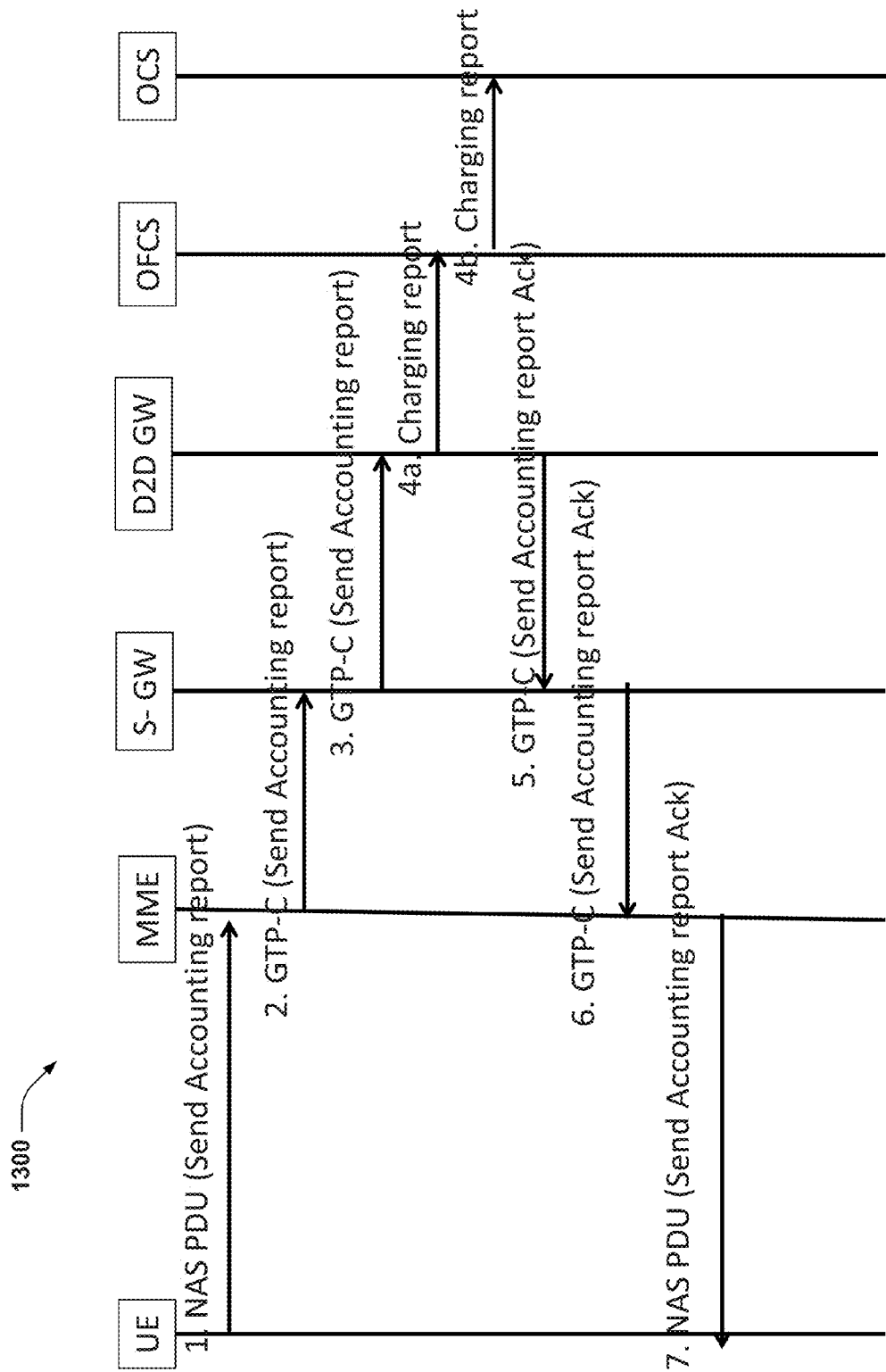
FIG. 13 illustrates an example signaling flow method for accounting data reporting based on an alternative to Sdx such as using a bearer for D2D control.

FIG. 13 illustrates an example signaling flow method for accounting data reporting based on an alternative to Sdx such as using a bearer for D2D control.

Figure 14:
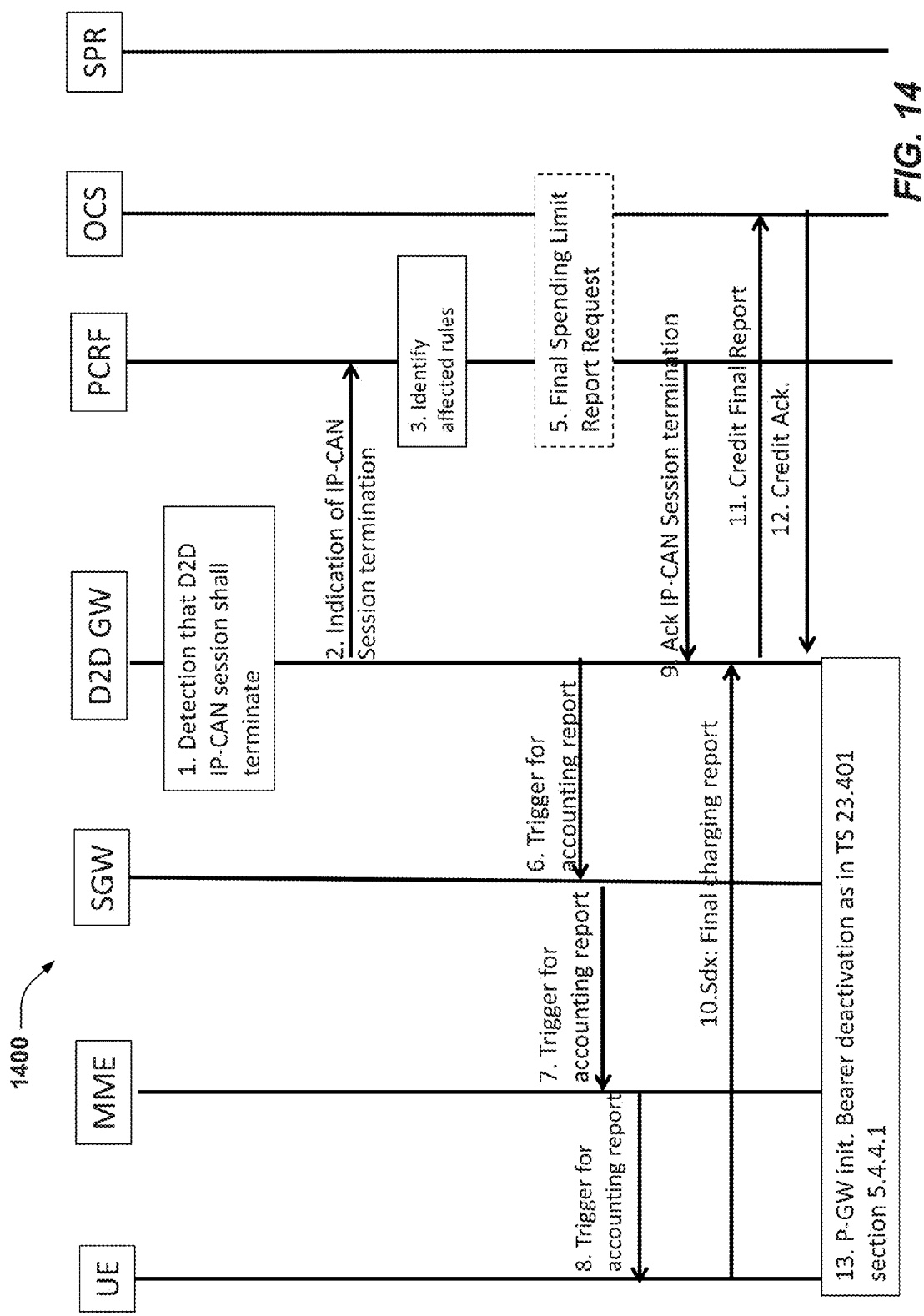
FIG. 14 illustrates an example signaling flow method for session termination based on an alternative to Sdx such as using a bearer for D2D control.

FIG. 14 illustrates an example signaling flow method for session termination based on an alternative to Sdx such as using a bearer for D2D control.

Figure 15:
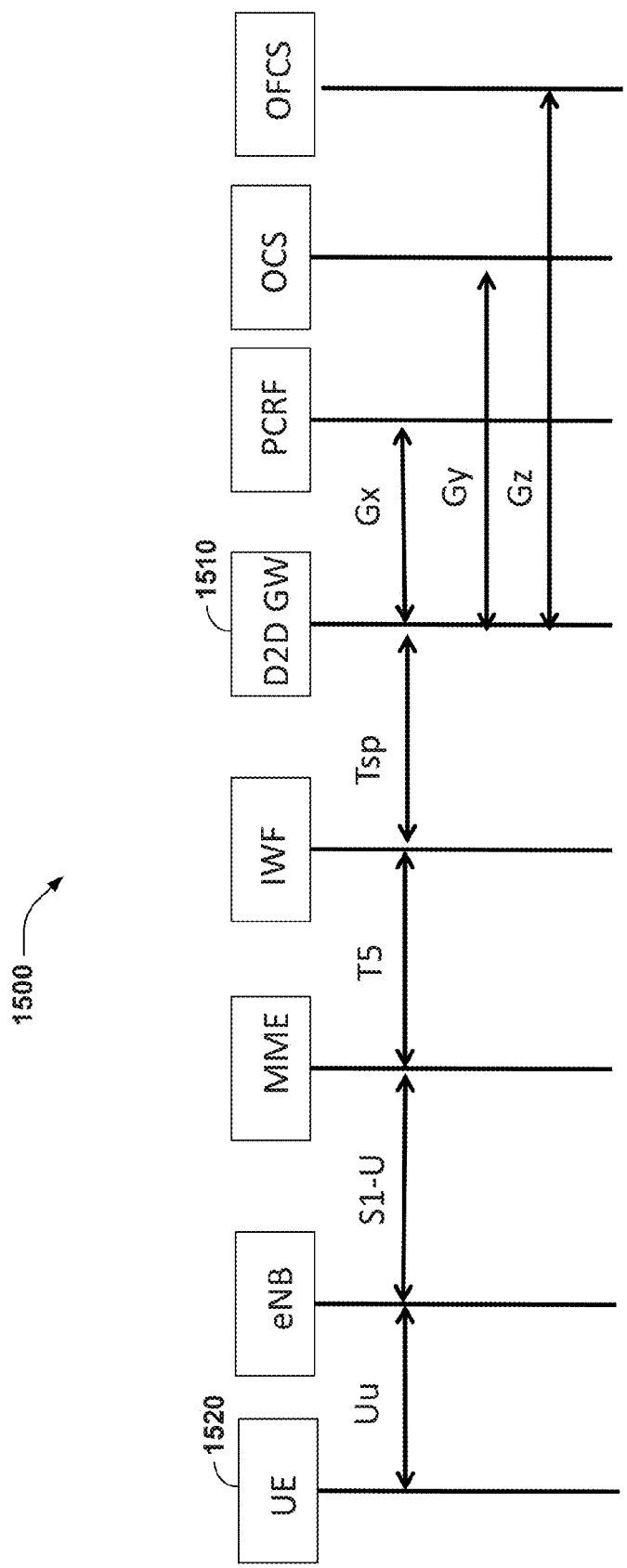
FIG. 15 illustrates an alternative to Sdx such as using T5 messages for D2D PCC.

FIG. 15 illustrates an alternative to Sdx such as using T5 messages for D2D PCC.

In another aspect, an alternative to Sdx may include D2D PCC via T5 messages. In the DL, T5 messages from the D2D GW 1510 may be used in order to trigger policy enforcement to the UE. In the UL, the UE 1520 may perform accounting reporting using T5 messages.

Figure 16:
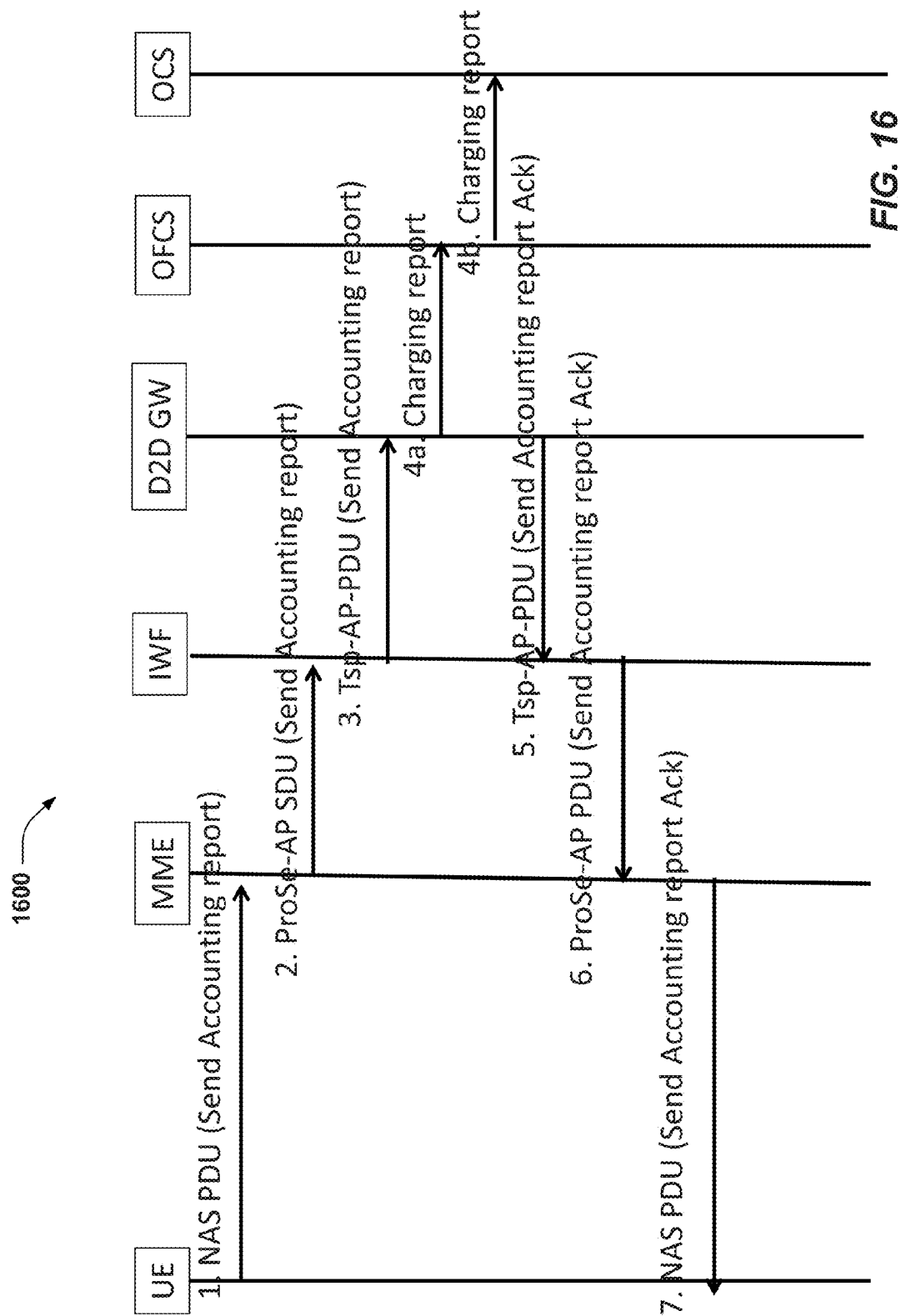
FIG. 16 illustrates an example signaling flow method for accounting data reporting based on an alternative to Sdx such as using T5 messaging.

FIG. 16 illustrates an example signaling flow method for accounting data reporting based on an alternative to Sdx such as using T5 messaging.

Figure 17:
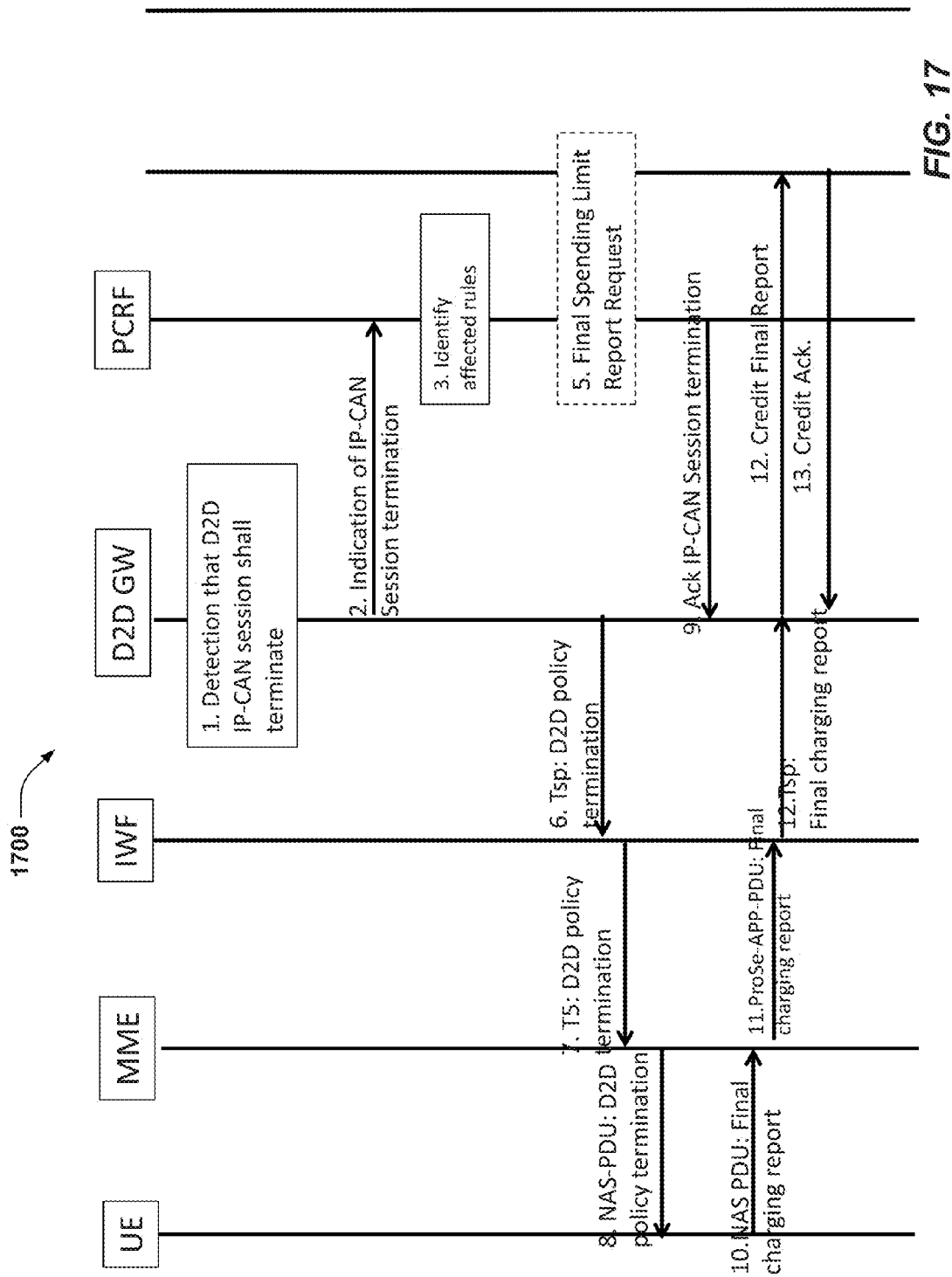
FIG. 17 illustrates an example signaling flow method for session termination based on an alternative to Sdx such as using T5 messaging for D2D PCC.

FIG. 17 illustrates an example signaling flow method for session termination based on an alternative to Sdx such as using T5 messaging for D2D PCC.

PCC procedures may include procedures from 3GPP TS 23.203. Charging procedures and methods may include techniques from 3GPP TS 23.203, 3GPP TS 32.240, and 3GPP TS 32.251. EPS procedures may include techniques from 3GPP TS 23.401. T5 messaging may include techniques from 3GPP TR 23.887.

Figure 18A:
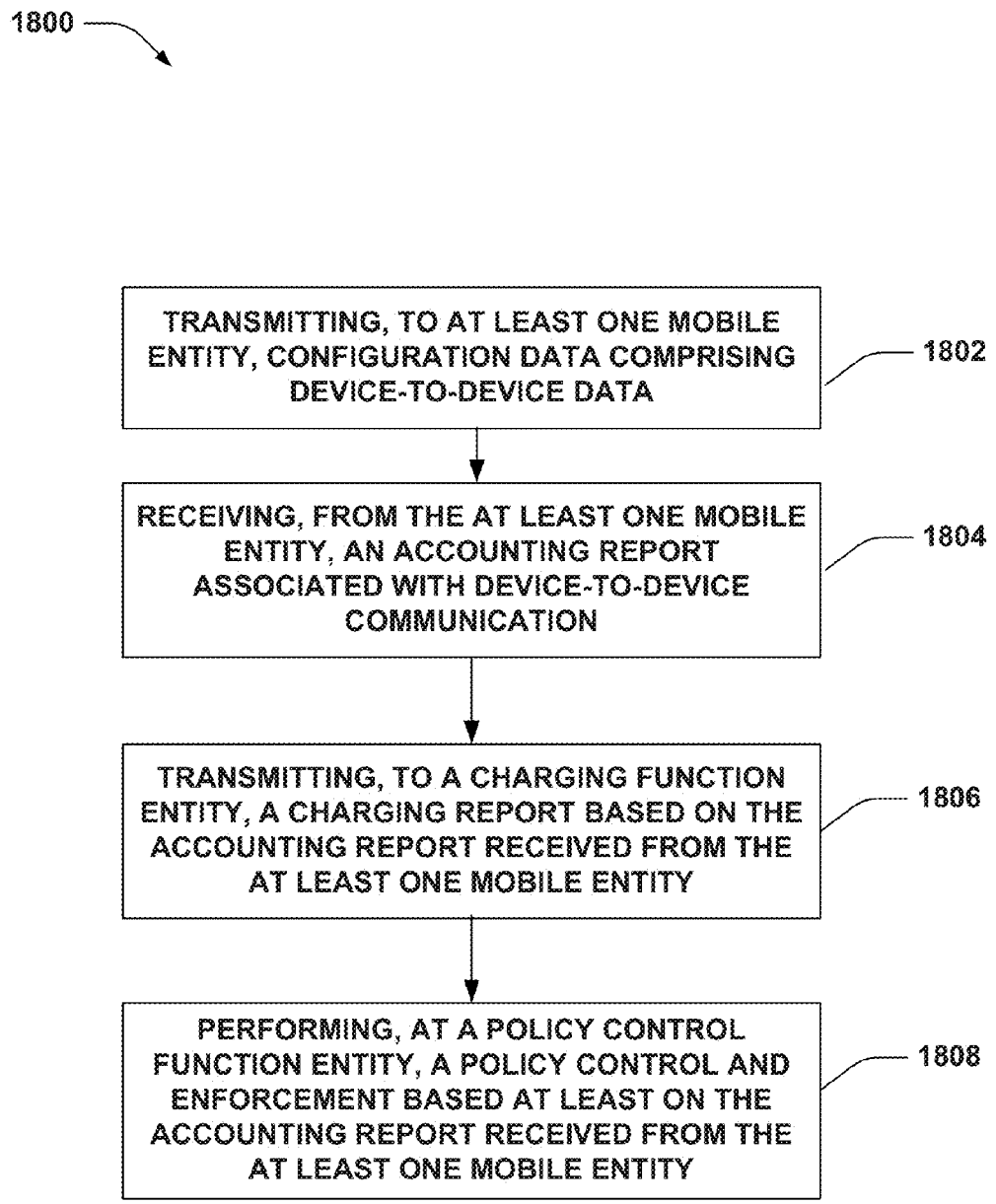
FIG. 18a illustrates a methodology for policy control and charging for D2D services.

In accordance with one or more aspects of the embodiments described herein, with reference to FIG. 18a, there is shown a methodology 1800, operable by a network entity, such as, for example, a PCRF entity, DPF/DAPF, D2D GW, DCRF DPCEF, or the like. Specifically, method 1800 describes policy control and charging for D2D services. The method 1800 may involve, at 1802, transmitting, to at least one mobile entity, configuration data comprising device-to-device data. The method 1800 may involve, at 1804, receiving, from the at least one mobile entity, an accounting report associated with device-to-device communication. The method 1800 may involve, at 1806, transmitting, to a charging function entity, a charging report based on the accounting report received from the at least one mobile entity. The method 1800 may involve, at 1808, performing, at a policy control function entity, a policy control and enforcement based at least on the accounting report received from the at least one mobile entity.

Figure 18B:
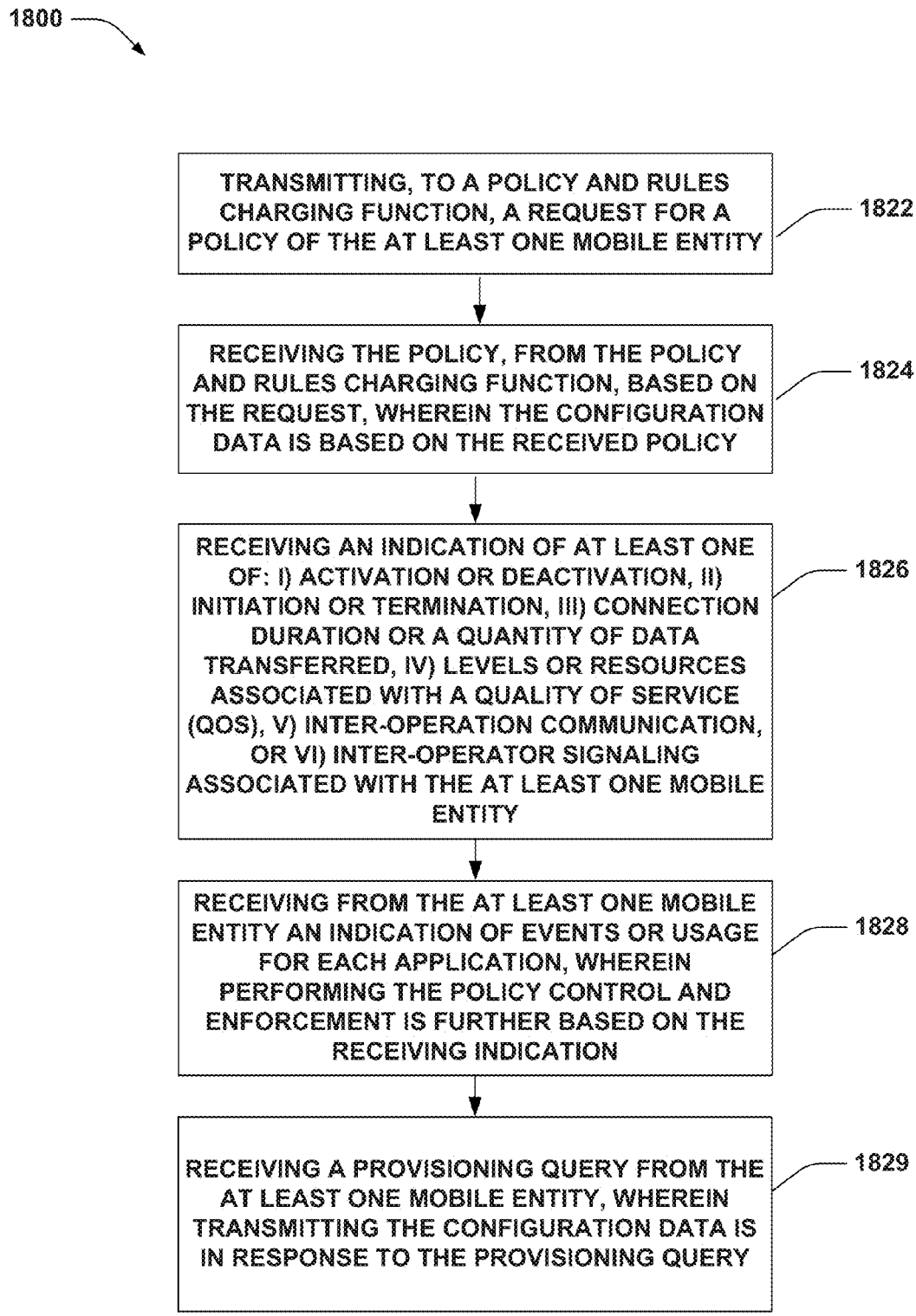

FIG. 18b illustrates further operations or aspects that are optional in accordance with the methodology of FIG. 18a and may be performed by a mobile device or component(s) thereof. The method 1800 may terminate after any of the shown blocks without necessarily having to include any subsequent downstream block(s) that may be illustrated. It is further noted that numbers of the blocks do not imply a particular order in which the blocks may be performed according to the method 1800.

The method 1800 may optionally involve, at 1822, transmitting, to a policy and rules charging function, a request for a policy of the at least one mobile entity.

The method 1800 may optionally involve, at 1824, receiving the policy, from the policy and rules charging function, based on the request, wherein the configuration data is based on the received policy.

The method 1800 may optionally involve, at 1826, receiving an indication of at least one of: i) activation or deactivation, ii) initiation or termination, iii) connection duration or a quantity of data transferred, iv) levels or resources associated with a quality of service (QoS), v) inter-operation communication, or vi) inter-operator signaling associated with the at least one mobile entity.

The method 1800 may optionally involve, at 1828, receiving from the at least one mobile entity an indication of events or usage for each application, wherein performing the policy control and enforcement is further based on the receiving indication.

The method 1800 may optionally involve, at 1829, receiving a provisioning query from the at least one mobile entity, wherein transmitting the configuration data is in response to the provisioning query.

Figure 18C:
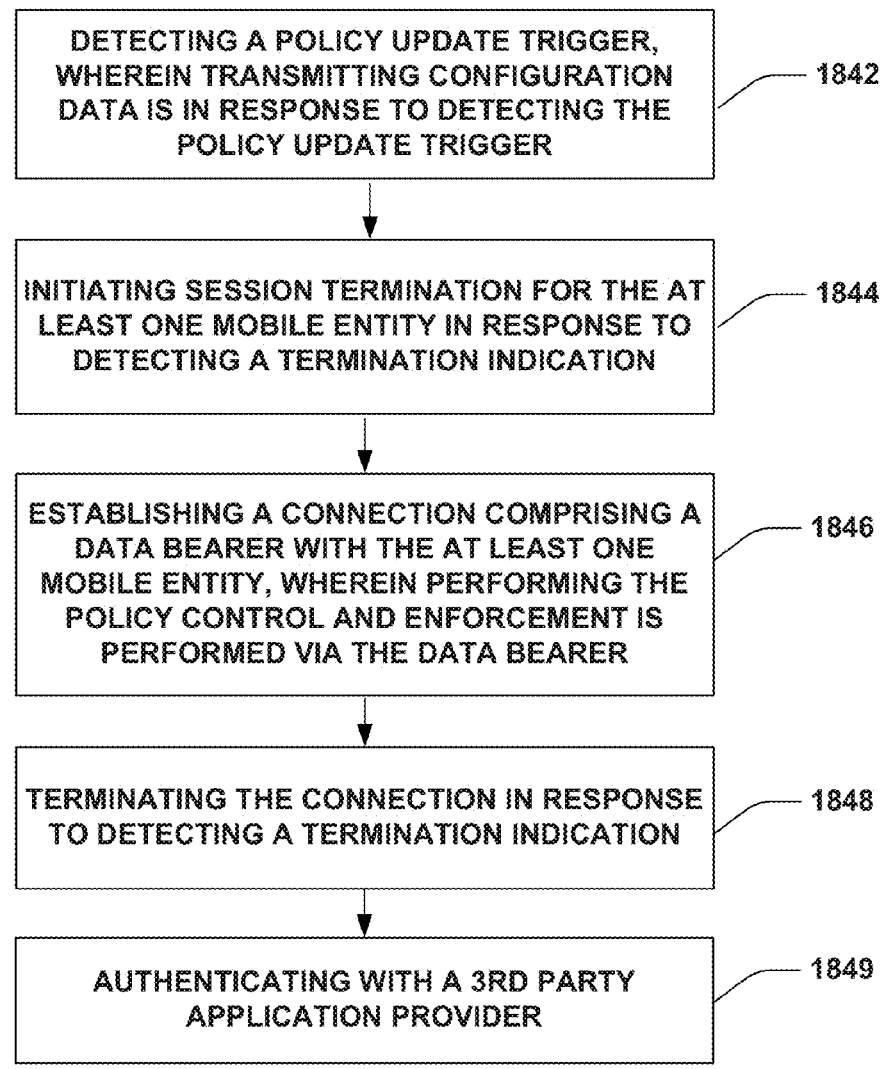

FIG. 18c illustrates further operations or aspects that are optional in accordance with the methodology of FIG. 18c and may be performed by a mobile device or component(s) thereof. The method 1800 may terminate after any of the shown blocks without necessarily having to include any subsequent downstream block(s) that may be illustrated. It is further noted that numbers of the blocks do not imply a particular order in which the blocks may be performed according to the method 1800.

The method 1800 may optionally involve, at 1842, detecting a policy update trigger, wherein transmitting configuration data is in response to detecting the policy update trigger.

The method 1800 may optionally involve, at 1844, initiating session termination for the at least one mobile entity in response to detecting a termination indication.

The method 1800 may optionally involve, at 1846, establishing a connection comprising a data bearer with the at least one mobile entity, wherein performing the policy control and enforcement is performed via the data bearer.

The method 1800 may optionally involve, at 1848, terminating the connection in response to detecting a termination indication.

The method 1800 may optionally involve, at 1849, authenticating with a 3rd party application provider.

Figure 19A:
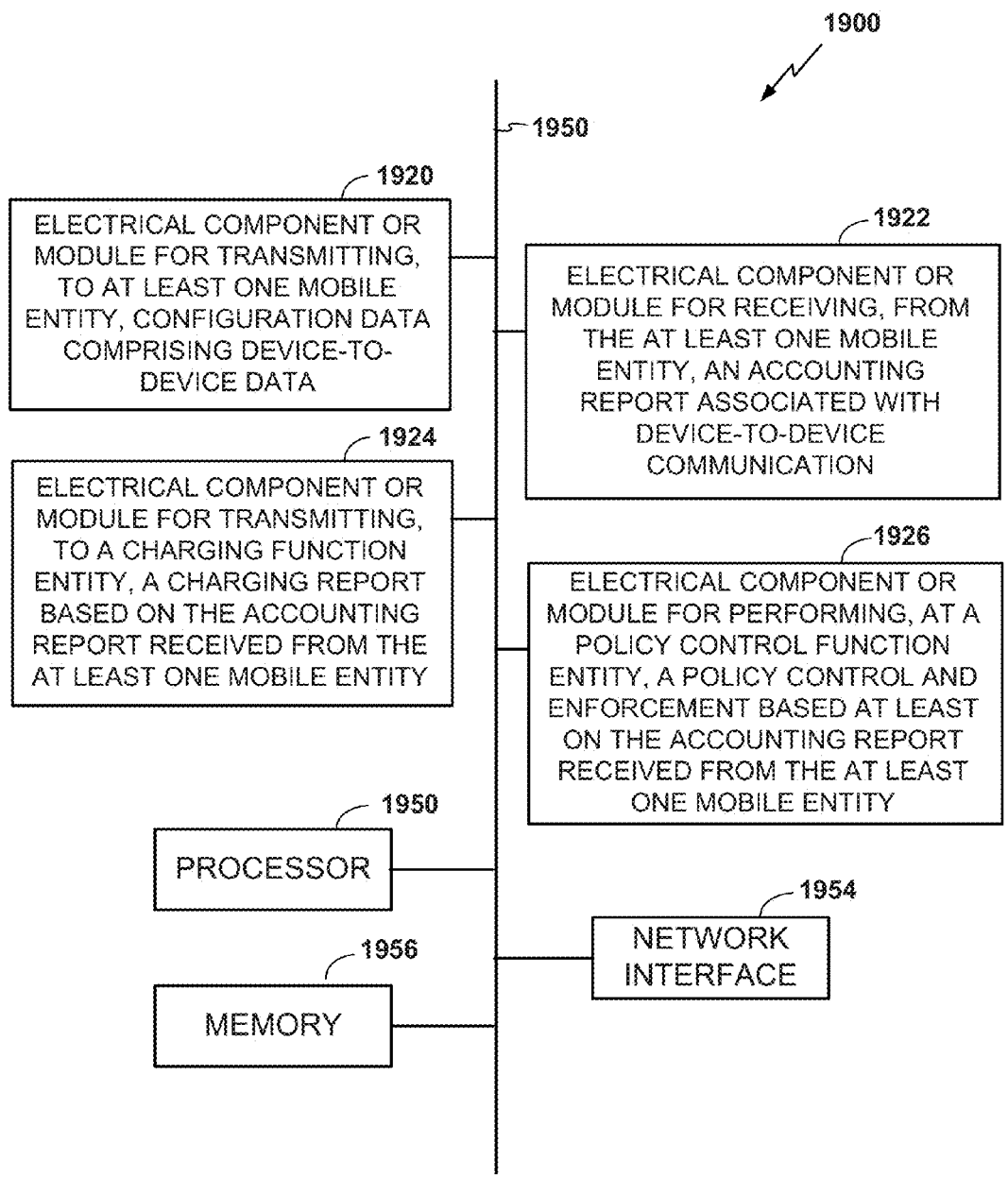

FIG. 19a shows an embodiment of an apparatus for station assisted channel selection, in accordance with the methodology of FIG. 18. With reference to FIG. 19a, there is provided an exemplary apparatus 1900 that may be configured as a network entity (e.g., a PCRF entity, DPF/DAPF, D2D GW, DCRF DPCEF or the like) in a wireless network, or as a processor or similar device/component for use within the network entity. The apparatus 1900 may include functional blocks that can represent functions implemented by a processor, software, or combination thereof (e.g., firmware). For example, apparatus 1900 may include an electrical component or module 1920 for transmitting, to at least one mobile entity, configuration data comprising device-to-device data. The apparatus 1900 may include an electrical component or module 1922 for receiving, from the at least one mobile entity, an accounting report associated with device-to-device communication. The apparatus 1900 may include an electrical component or module 1924 for transmitting, to a charging function entity, a charging report based on the accounting report received from the at least one mobile entity. The apparatus 1900 may include an electrical component or module 1926 for performing, at a policy control function entity, a policy control and enforcement based at least on the accounting report received from the at least one mobile entity.

In related aspects, the apparatus 1900 may optionally include a processor component 1950 having at least one processor, in the case of the apparatus 1900 configured as a network entity, rather than as a processor. The processor 1950, in such case, may be in operative communication with the components 1920-1926 via a bus 1952 or similar communication coupling. The processor 1950 may effect initiation and scheduling of the processes or functions performed by electrical components 1920-1926.

In further related aspects, the apparatus 1900 may include a radio transceiver component 1954. A stand alone receiver and/or stand alone transmitter may be used in lieu of or in conjunction with the transceiver 1954. When the apparatus 1900 is a network entity, the apparatus 1900 may also include a network interface (not shown) for connecting to one or more core network entities. The apparatus 1900 may optionally include a component for storing information, such as, for example, a memory device/component 1956. The computer readable medium or the memory component 1956 may be operatively coupled to the other components of the apparatus 1900 via the bus 1952 or the like. The memory component 1956 may be adapted to store computer readable instructions and data for effecting the processes and behavior of the components 1920-1926, and subcomponents thereof, or the processor 1950, or the methods disclosed herein. The memory component 1956 may retain instructions for executing functions associated with the components 1920-1926. While shown as being external to the memory 1956, it is to be understood that the components 1920-1926 can exist within the memory 1956. It is further noted that the components in FIG. 19*a* may comprise processors, electronic devices, hardware devices, electronic sub-components, logical circuits, memories, software codes, firmware codes, etc., or any combination thereof.

Figure 19B:
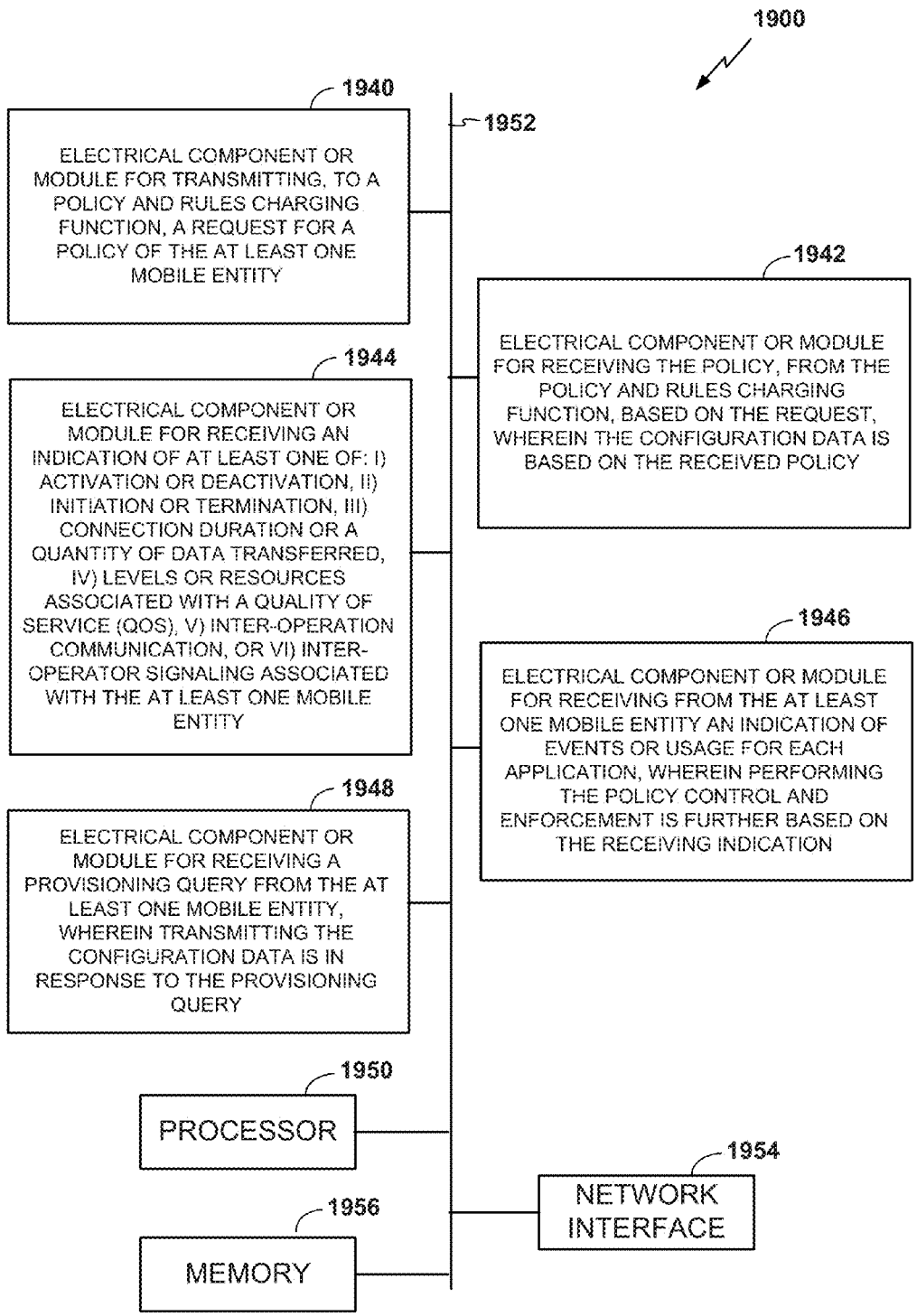

In accordance with one or more aspects of the examples described herein, FIG. 19*b* illustrates optional components for the apparatus of FIG. 19*a*. The apparatus 1900 may include an electrical component or module 1940 for transmitting, to a policy and rules charging function, a request for a policy of the at least one mobile entity.

The apparatus 1900 may include an electrical component or module 1942 for receiving the policy, from the policy and rules charging function, based on the request, wherein the configuration data is based on the received policy.

The apparatus 1900 may include an electrical component or module 1944 for receiving an indication of at least one of: i) activation or deactivation, ii) initiation or termination, iii) connection duration or a quantity of data transferred, iv) levels or resources associated with a quality of service (QoS), v) inter-operation communication, or vi) inter-operator signaling associated with the at least one mobile entity.

The apparatus 1900 may include an electrical component or module 1946 for receiving from the at least one mobile entity an indication of events or usage for each application, wherein performing the policy control and enforcement is further based on the receiving indication.

The apparatus 1900 may include an electrical component or module 1948 for receiving a provisioning query from the at least one mobile entity, wherein transmitting the configuration data is in response to the provisioning query.

For the sake of conciseness, the rest of the details regarding apparatus 1900 are not further elaborated on; however, it is to be understood that the remaining features and aspects of the apparatus 1900 of FIG. 19*b* are substantially similar to those described above with respect to apparatus 1900 of FIG. 19*a*. Persons skilled in the art will appreciate that the functionalities of each component of apparatus 1900 can be implemented in any suitable component of the system or combined in any suitable manner.

Figure 19C:
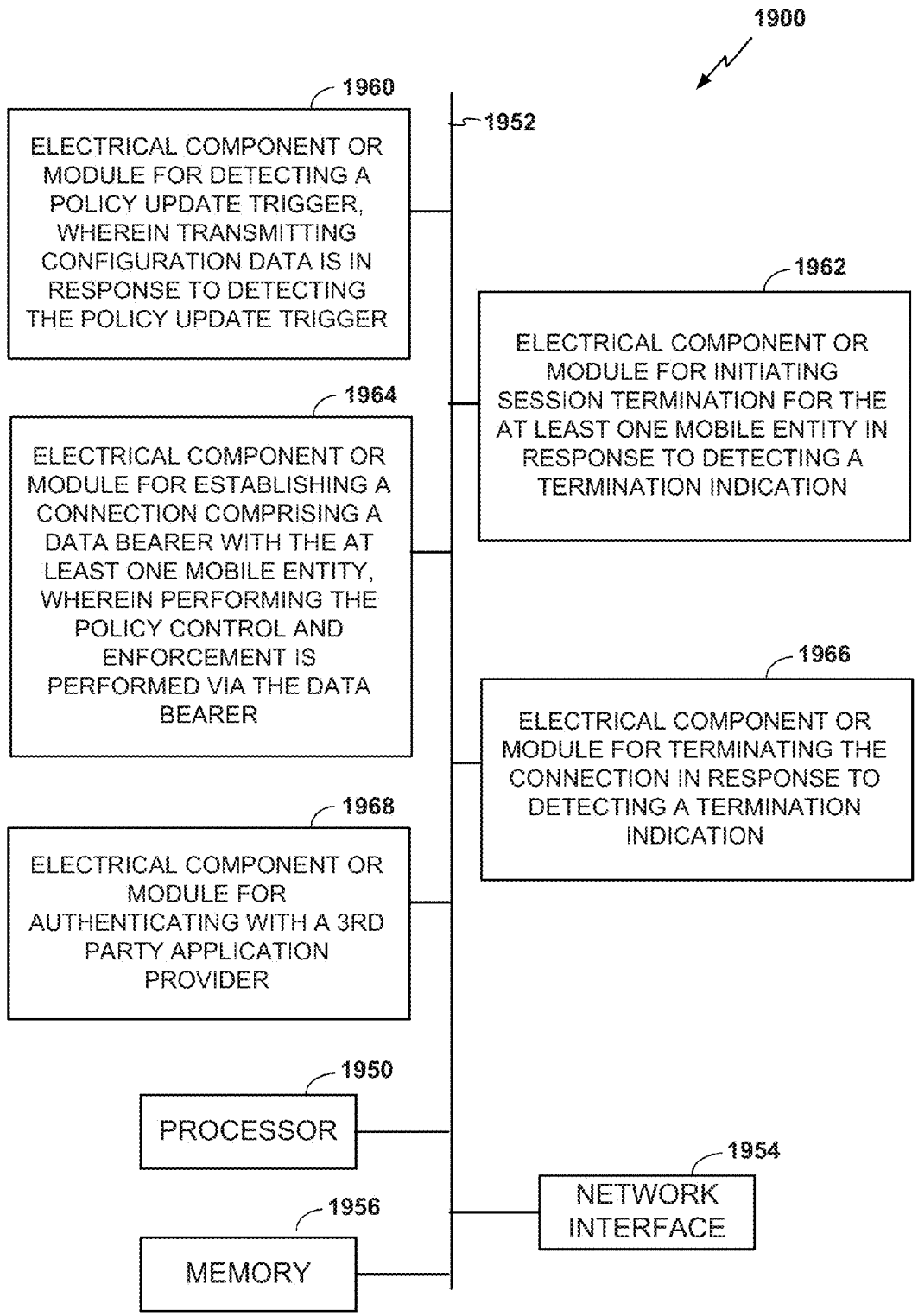

In accordance with one or more aspects of the examples described herein, FIG. 19*c* illustrates optional components for the apparatus of FIG. 19*a*. The apparatus 1900 may include an electrical component or module 1960 for detecting a policy update trigger, wherein transmitting configuration data is in response to detecting the policy update trigger.

The apparatus 1900 may include an electrical component or module 1962 for initiating session termination for the at least one mobile entity in response to detecting a termination indication.

The apparatus 1900 may include an electrical component or module 1964 for establishing a connection comprising a data bearer with the at least one mobile entity, wherein performing the policy control and enforcement is performed via the data bearer.

The apparatus 1900 may include an electrical component or module 1966 for terminating the connection in response to detecting a termination indication.

The apparatus 1900 may include an electrical component or module 1968 for authenticating with a 3rd party application provider.

For the sake of conciseness, the rest of the details regarding apparatus 1900 are not further elaborated on; however, it is to be understood that the remaining features and aspects of the apparatus 1900 of FIG. 19*c* are substantially similar to those described above with respect to apparatus 1900 of FIG. 19*a*. Persons skilled in the art will appreciate that the functionalities of each component of apparatus 1900 can be implemented in any suitable component of the system or combined in any suitable manner.

Figure 20:
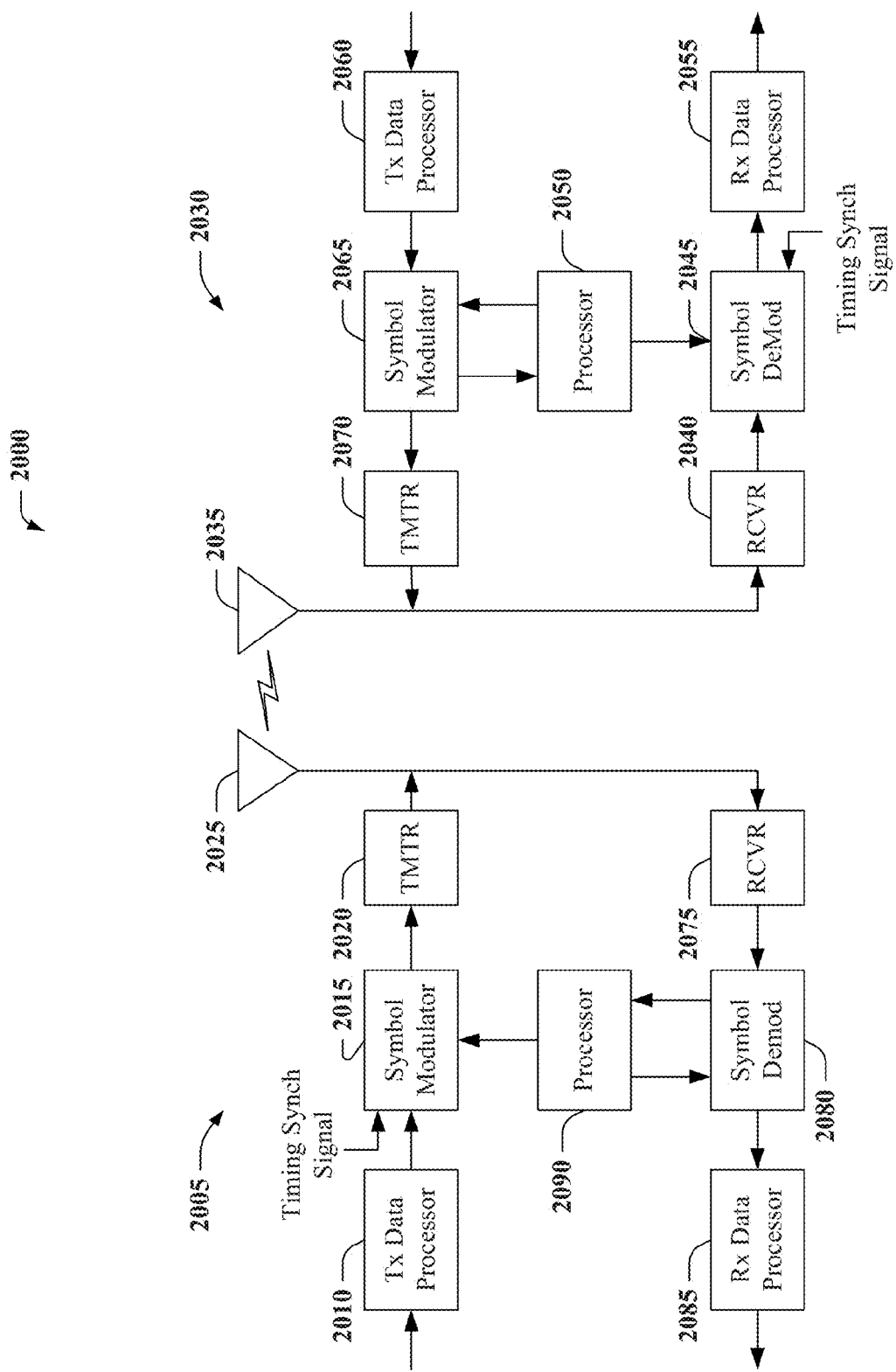
FIG. 20 depicts a block diagram of an example system 2000 that can facilitate D2D wireless communication according to some aspects disclosed herein.

FIG. 20 depicts a block diagram of an example system 2000 that can facilitate D2D wireless communication according to some aspects disclosed herein. Based on timing sequence of a synchronization timing signal (e.g., see FIG. 2, supra) obtained at a wireless terminal 2005, a transmit (TX) data processor 2010 receives, formats, codes, interleaves, and modulates (or symbol maps) traffic data and provides modulation symbols ("data symbols"). A symbol modulator 2015 receives and processes the data symbols and pilot symbols and provides a stream of symbols. A symbol modulator 2020 multiplexes data and pilot symbols and provides them to a transmitter unit (TMTR) 2020. Each transmit symbol can be a data symbol, a pilot symbol, or a signal value of zero.

TMTR 2020 receives and converts the stream of symbols into one or more analog signals and further conditions (e.g., amplifies, filters, and frequency upconverts) the analog signals to generate a transmit signal suitable for transmission over the wireless channel. The transmit signal is then transmitted through an antenna 2025 to a remote terminal(s) or other D2D partner. At wireless terminal 2030, also based on the timing sequence of the synchronization signal, an antenna 2035 receives the transmit signal sent by TMTR 2020 and provides a received signal to a receiver unit (RCVR) 2040. Receiver unit 2040 conditions (e.g., filters, amplifies, and frequency downconverts) the received signal and digitizes the conditioned signal to obtain samples. A symbol demodulator 2045 demodulates and provides received pilot symbols to a processor 2050 for channel estimation. Symbol demodulator 2045 further receives a frequency response estimate for the downlink from processor 2050, performs data demodulation on the received data symbols to obtain data symbol estimates (which are estimates of the transmitted data symbols), and provides the data symbol estimates to an RX data processor 2055, which demodulates (i.e., symbol demaps), deinterleaves, and decodes the data symbol estimates to recover the transmitted traffic data. The processing by symbol demodulator 2045 and RX data processor 2055 is complementary to the processing by symbol modulator 2015 and TX data processor 2010, respectively, at wireless terminal 2005.

On the wireless terminal 2030, a TX data processor 2060 processes traffic data and provides data symbols. A symbol modulator 2065 receives and multiplexes the data symbols with pilot symbols, performs modulation, and provides a stream of symbols. A transmitter unit 2070 then receives and processes the stream of symbols to generate a signal, which is transmitted by the antenna 2035 to the wireless terminal 2005.

At wireless terminal 2005, the uplink signal from terminal 2030 is received by the antenna 2025 and processed by a receiver unit 2075 to obtain samples. A symbol demodulator 2080 then processes the samples and provides received pilot symbols and data symbol estimates for the communication channel. An RX data processor 2085 processes the data symbol estimates to recover the traffic data transmitted by terminal 2030. A processor 2090 performs channel estimation for each active D2D partner transmitting on the communication channel. Multiple terminals can transmit pilots concurrently on D2D channels, or on their respective sets of D2D channel subbands, where D2D channel subband sets can be interlaced.

Processors 2090 and 2050 direct (e.g., control, coordinate, manage, etc.) operation at terminal 2005 and terminal 2030, respectively. Respective processors 2090 and 2050 can be associated with memory units (not shown) that store program codes and data. Processors 2090 and 2050 can also perform computations to derive frequency and impulse response estimates for the communication channel, respectively.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 2090 and 2050.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for policy and charging control in a wireless communication system, the method comprising:
    transmitting, to at least one user terminal, configuration data comprising device-to-device data that is based at least in part on a device-to-device communication;
    receiving, from the at least one user terminal, an accounting report including information, associated with the device-to-device communication, identifying a quantity of packets or bytes of data transmitted between the at least one user terminal and another device-to-device enabled user terminal, and a duration that the at least one user terminal spent in an active state;
    transmitting, to a charging function entity, a charging report based on the accounting report received from the at least one user terminal; and
    performing, at a policy control function entity, a policy control and enforcement based at least on the accounting report received from the at least one user terminal.

2. The method of claim 1, wherein the device-to-device data comprises an indication of whether the at least one user terminal is permitted to discover the another device-to-device enabled user terminal, or to be discoverable by the another device-to-device enabled user terminal.

3. The method of claim 1, wherein device-to-device data comprises an indication of an allowable number of expressions for the at least one user terminal.

4. The method of claim 1, wherein the device-to-device data comprises data corresponding to specific applications.

5. The method of claim 1, wherein the policy control and enforcement comprise network access, resource, or quality of service (QoS) control.

6. The method of claim 1, further comprising:
    transmitting, to a policy and rules charging function, a request for a policy of the at least one user terminal; and
    receiving the policy, from the policy and rules charging function, based on the request, wherein the configuration data is based on the received policy.

7. The method of claim 1, further comprising:
    receiving an indication of at least one of:
        i) activation or deactivation, ii) initiation or termination, iii) connection duration or a quantity of data transferred, iv) levels or resources associated with a quality of service (QoS), v) inter-operation communication, or vi) inter-operator signaling associated with the at least one user terminal.

8. The method of claim 4, further comprising:
receiving from the at least one user terminal an indication of events or usage for each application of the specific applications,
wherein performing the policy control and enforcement is further based on the indication.

9. The method of claim 1, further comprising:
receiving a provisioning query from the at least one user terminal,
wherein transmitting the configuration data is based on the provisioning query.

10. The method of claim 1, further comprising:
detecting a policy update trigger,
wherein transmitting configuration data is based on detecting the policy update trigger.

11. The method of claim 1, further comprising:
initiating session termination for the at least one user terminal based on detecting a termination indication.

12. The method of claim 1, further comprising:
establishing a connection comprising a data bearer with the at least one user terminal,
wherein performing the policy control and enforcement is performed via the data bearer.

13. The method of claim 12, wherein the at least one user terminal is enabled for device-to-device discovery and communication while the data bearer is active.

14. The method of claim 12, further comprising:
terminating the connection based on detecting a termination indication.

15. The method of claim 1, wherein the accounting report is received via a connection comprising a data bearer.

16. The method of claim 1, further comprising:
transmitting the configuration data via a small data interface, and
receiving the accounting report via the small data interface.

17. The method of claim 1, further comprising:
initiating session termination, for the at least one user terminal based on detecting a termination indication, via a small data interface.

18. The method of claim 1, further comprising:
authenticating with a third party application provider.

19. An apparatus for policy and charging control in a wireless communication system, the apparatus comprising:
at least one transceiver configured to:
transmit, to at least one user terminal, configuration data comprising device-to-device data that is based at least in part on a device-to-device communication,
receive, from the at least one user terminal, an accounting report including information, associated with the device-to-device communication, identifying a quantity of packets or bytes of data transmitted between the at least one user terminal and another device-to-device enabled user terminal, and a duration that the at least one user terminal spent in an active state; and
transmit, to a charging function entity, a charging report based on the accounting report received from the at least one user terminal;
at least one processor configured to:
perform a policy control and enforcement based at least on the accounting report received from the at least one user terminal; and
a memory coupled to the at least one processor for storing data.

20. The apparatus of claim 19, wherein the at least one transceiver is further configured to:
transmit, to a policy and rules charging function, a request for a policy of the at least one user terminal; and
receive the policy, from the policy and rules charging function, based on the request,
wherein the configuration data is based on the received policy.

21. The apparatus of claim 19, wherein the at least one transceiver is further configured to:
receive an indication of at least one of:
i) activation or deactivation, ii) initiation or termination, iii) connection duration or a quantity of data transferred, iv) levels or resources associated with a quality of service (QoS), v) inter-operation communication, or vi) inter-operator signaling associated with the at least one user terminal.

22. The apparatus of claim 19, wherein the at least one processor is further configured to:
establish a connection comprising a data bearer with the at least one user terminal,
wherein the policy control and enforcement is performed via the data bearer.

23. The apparatus of claim 19, wherein the at least one transceiver is further configured to:
transmit the configuration data via a small data interface, and
receive the accounting report via the small data interface.

24. An apparatus for policy and charging control in a wireless communication system, the apparatus comprising:
means for transmitting, to at least one user terminal, configuration data comprising device-to-device data that is based at least in part on a device-to-device communication;
means for receiving, from the at least one user terminal, an accounting report including information, associated with the device-to-device communication, identifying a quantity of packets or bytes of data transmitted between the at least one user terminal and another device-to-device enabled user terminal, and a duration that the at least one user terminal spent in an active state;
means for transmitting, to a charging function entity, a charging report based on the accounting report received from the at least one user terminal; and
means for performing a policy control and enforcement based at least on the accounting report received from the at least one user terminal.

25. The apparatus of claim 24, further comprising:
means for transmitting, to a policy and rules charging function, a request for a policy of the at least one user terminal; and
means for receiving the policy, from the policy and rules charging function, based on the request,
wherein the configuration data is based on the received policy.

26. The apparatus of claim 24, further comprising:
means for receiving an indication of at least one of:
i) activation or deactivation, ii) initiation or termination, iii) connection duration or a quantity of data transferred, iv) levels or resources associated with a quality of service (QoS), v) inter-operation communication, or vi) inter-operator signaling associated with the at least one user terminal.

27. The apparatus of claim 24, further comprising:
means for establishing a connection comprising a data bearer with the at least one user terminal,
wherein performing the policy control and enforcement is performed via the data bearer.

28. The apparatus of claim 24, further comprising:
means for transmitting the configuration data via a small data interface, and
means for receiving the accounting report via the small data interface.

29. A non-transitory computer-readable medium storing instructions, the instructions comprising:
one or more instructions which, when executed by at least one computer, cause the at least one computer to:
transmit, to at least one user terminal, configuration data comprising device-to-device data that is based at least in part on a device-to-device communication;
receive, from the at least one user terminal, an accounting report including information, associated with the device-to-device communication, identifying a quantity of packets or bytes of data transmitted between the at least one user terminal and another device-to-device enabled user terminal, and a duration that the at least one user terminal spent in an active state;
transmit, to a charging function entity, a charging report based on the accounting report received from the at least one user terminal; and
perform a policy control and enforcement based at least on the accounting report received from the at least one user terminal.

* * * * *